US012789346B2

(12) United States Patent
Ellena et al.

(10) Patent No.: US 12,789,346 B2
(45) Date of Patent: Nov. 10, 2026

(54) POWER TOOL BRAKE ABORT

(71) Applicant: MILWAUKEE ELECTRIC TOOL CORPORATION, Brookfield, WI (US)

(72) Inventors: Mitchell A. Ellena, West Allis, WI (US); Ryan Khatib, Waukesha, WI (US); Lokeshwaran Rajendran, Waukesha, WI (US); David A. Bierdeman, New Berlin, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 19/189,779

(22) Filed: Apr. 25, 2025

(65) Prior Publication Data

US 2025/0269509 A1 Aug. 28, 2025

Related U.S. Application Data

(63) Continuation of application No. 18/884,319, filed on Sep. 13, 2024, now Pat. No. 12,539,592.

(60) Provisional application No. 63/582,584, filed on Sep. 14, 2023.

(51) Int. Cl.
*B25F 5/00* (2006.01)
*B25B 23/147* (2006.01)

(52) U.S. Cl.
CPC .............. *B25F 5/00* (2013.01); *B25B 23/147* (2013.01)

(58) Field of Classification Search
CPC .......... B25B 23/147; B25C 1/008; B25F 5/00
See application file for complete search history.

(56) References Cited

U.S. PATENT DOCUMENTS

| | | | | |
|---|---|---|---|---|
| 11,130,221 | B2 * | 9/2021 | Mikat-Stevens | B25C 1/041 |
| 12,036,649 | B2 * | 7/2024 | Robinson | B25C 1/04 |
| 2005/0040206 | A1 * | 2/2005 | Adams | B25C 1/008 173/117 |
| 2011/0303719 | A1 | 12/2011 | Spasov et al. | |
| 2011/0303724 | A1 | 12/2011 | Groer et al. | |
| 2011/0303725 | A1 | 12/2011 | Schaer et al. | |
| 2011/0303730 | A1 | 12/2011 | Blessing et al. | |
| 2011/0303731 | A1 * | 12/2011 | Schiestl | B25C 1/003 227/156 |
| 2011/0303732 | A1 | 12/2011 | Blessing et al. | |

(Continued)

FOREIGN PATENT DOCUMENTS

| | | | | |
|---|---|---|---|---|
| CA | 2985110 | A1 * | 5/2018 | B25C 1/04 |
| EP | 3766638 | A1 * | 1/2021 | H02P 7/2913 |
| EP | 3321036 | B1 * | 2/2021 | B25C 1/04 |

*Primary Examiner* — Eyamindae C Jallow
(74) *Attorney, Agent, or Firm* — Michael Best & Friedrich LLP

(57) ABSTRACT

Power tools described herein include an electric motor, a driver blade, a trigger switch, a safety switch, and an electronic controller. The electronic controller is connected to the electric motor, the trigger switch, and the safety switch. The electronic controller is configured to initiate a retraction cycle by controlling the electric motor to move the driver blade from a first position to a second position, determine a position of the driver blade during the retraction cycle, initiate, in response to the position of the driver blade exceeding a first threshold, a braking cycle at the electric motor, and abort, in response to detecting a first activation of the trigger switch and a second activation of the safety switch, the braking cycle.

10 Claims, 20 Drawing Sheets

(56) References Cited

U.S. PATENT DOCUMENTS

| | | | | |
|---|---|---|---|---|
| 2018/0133877 | A1* | 5/2018 | Ueda | B25F 5/008 |
| 2018/0178361 | A1* | 6/2018 | Kabbes | B25C 1/008 |
| 2018/0207777 | A1* | 7/2018 | Cheatham | B25C 1/008 |
| 2021/0347023 | A1* | 11/2021 | Carrier | B25C 1/06 |
| 2021/0402578 | A1 | 12/2021 | Tanaka et al. | |
| 2023/0415319 | A1* | 12/2023 | Tsai | B21F 7/00 |
| 2024/0091918 | A1* | 3/2024 | Yang | B25C 1/06 |
| 2024/0253196 | A1* | 8/2024 | Miller | B25C 1/06 |
| 2024/0253197 | A1* | 8/2024 | Spayer | B25C 1/008 |

* cited by examiner

1400

POWER TOOL BRAKE ABORT

RELATED APPLICATIONS

This application is a continuation of U.S. patent application Ser. No. 18/884,319, filed Sep. 13, 2024, which claims the benefit of U.S. Provisional Application No. 63/582,584, filed Sep. 14, 2023, the entire content of each of which is hereby incorporated by reference.

FIELD

The present disclosure relates to power tools and, more particularly, to power tools with electronic control systems.

SUMMARY

Power tools described herein include an electric motor, a driver blade, a trigger switch, a safety switch, and an electronic controller. The electronic controller is connected to the electric motor, the trigger switch, and the safety switch. The electronic controller is configured to initiate a retraction cycle by controlling the electric motor to move the driver blade from a first position to a second position, determine a position of the driver blade during the retraction cycle, initiate, in response to the position of the driver blade exceeding a first threshold, a braking cycle at the electric motor, and abort, in response to detecting a first activation of the trigger switch and a second activation of the safety switch, the braking cycle.

Methods described herein for controlling an electric motor of a power tool include initiating a retraction cycle by controlling the electric motor to move a driver blade of the power tool from a first position to a second position, determining a position of the driver blade during the retraction cycle, initiating, in response to the position of the driver blade exceeding a first threshold, a braking cycle at the electric motor, and aborting, in response to detecting a first activation of a trigger switch and a second activation of a safety switch, the braking cycle.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

DETAILED DESCRIPTION

Embodiments described herein relate to electronic control systems for power tools (such as nailers or fastener drivers). The electronic control system may control the operating cycle of the power tool, which may be divided into a drive sequence and a retraction sequence. During the drive sequence, a driver blade is driven from a top-dead-center position to a bottom-dead-center position. During the retraction sequence, the driver blade is retracted from the bottom-dead-center position to the top-dead-center position. In some embodiments, the driver blade may be pneumatically driven during the drive sequence and retracted by an electric motor during the retraction sequence, for example, as the driver blade nears the top-dead-center position.

In various implementations, the electronic control system may command an electronic braking sequence during the retraction sequence. Electronic braking sequences may increase the life of the power tool by reducing wear and tear. For example, an effective braking sequence slows the electric motor and helps ensure that the electric motor stops promptly during the retraction cycle. However, as braking sequences reduce the operating speed of the electric motor, braking sequences may reduce the operating cycle rate of the power tool. Thus, under operating conditions where the user may wish to prioritize an increased firing rate, the electronic control system selectively skips the braking sequence (or aborts the braking sequence if has already begun), which increases the operating cycle rate of the power tool. Furthermore, electronic braking sequences may require additional current draw from a battery pack. Thus, introducing an abort sequence reduces overall current draw from the battery pack, which increases the battery pack life for the power tool.

Figure 1:
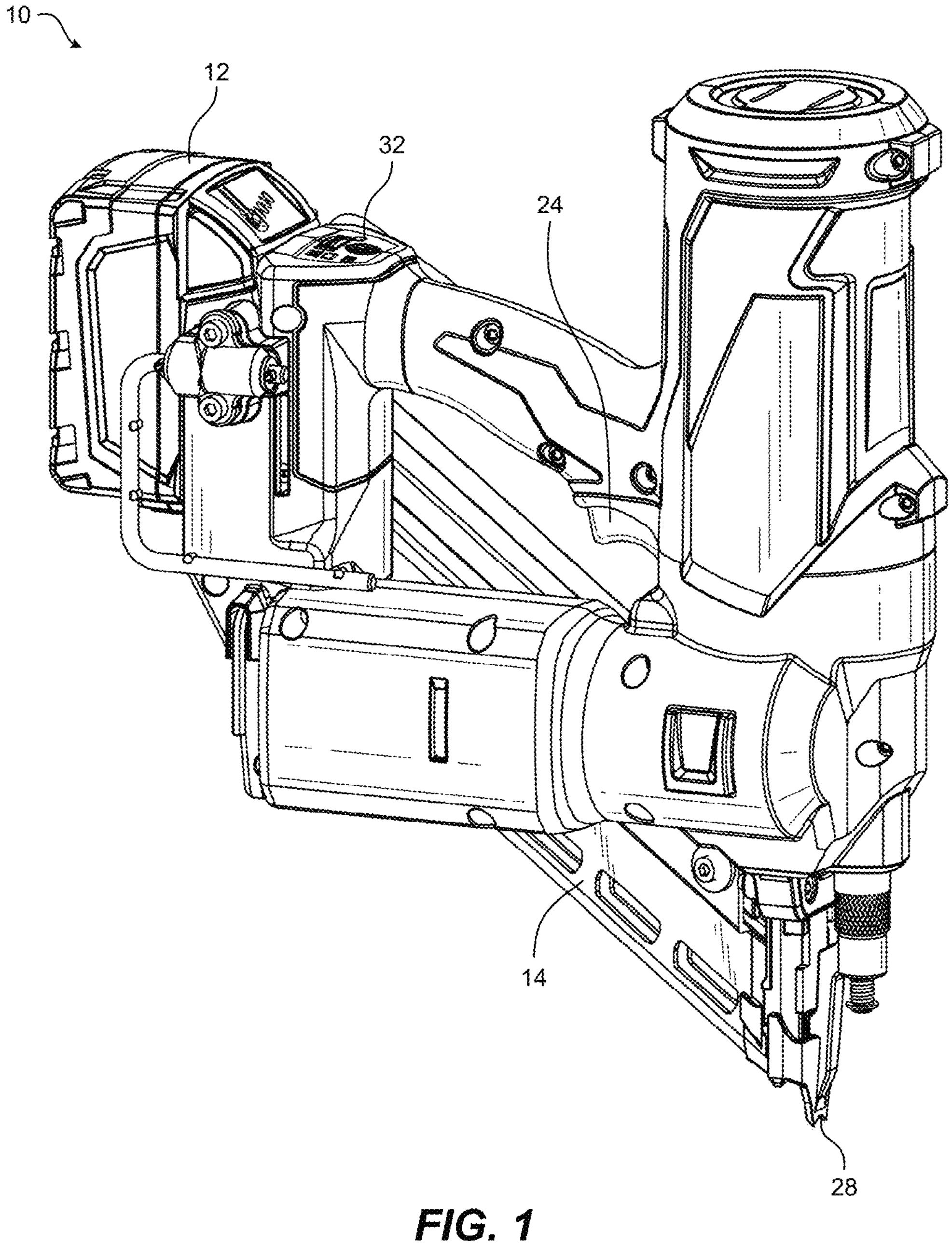
FIG. 1 illustrates a power tool, according to some embodiments.

FIG. 1 illustrates a power tool 10, such as a fastener driver or nailer 10 (e.g., a gas spring-powered nailer) that is operable to drive fasteners (e.g., single-headed nails, double-headed or duplex nails, tacks, staples, etc.) held within a magazine 14 into a workpiece. The nailer 10 is powered by a removable and rechargeable battery pack 12. In various implementations, a drive cycle of nailer 10 is initiated in response to a trigger 24 and/or safety 28 being depressed. In some embodiments, power tool 10 includes a mode selector 32 that allows a user to select between a first operating mode and a second operating mode. Although the methods and control techniques described herein are described in an exemplary manner primarily with respect to a nailer or other fastening device (e.g., a stapler), the methods and control techniques described herein can be implemented in other power tools 10.

Figure 2A:
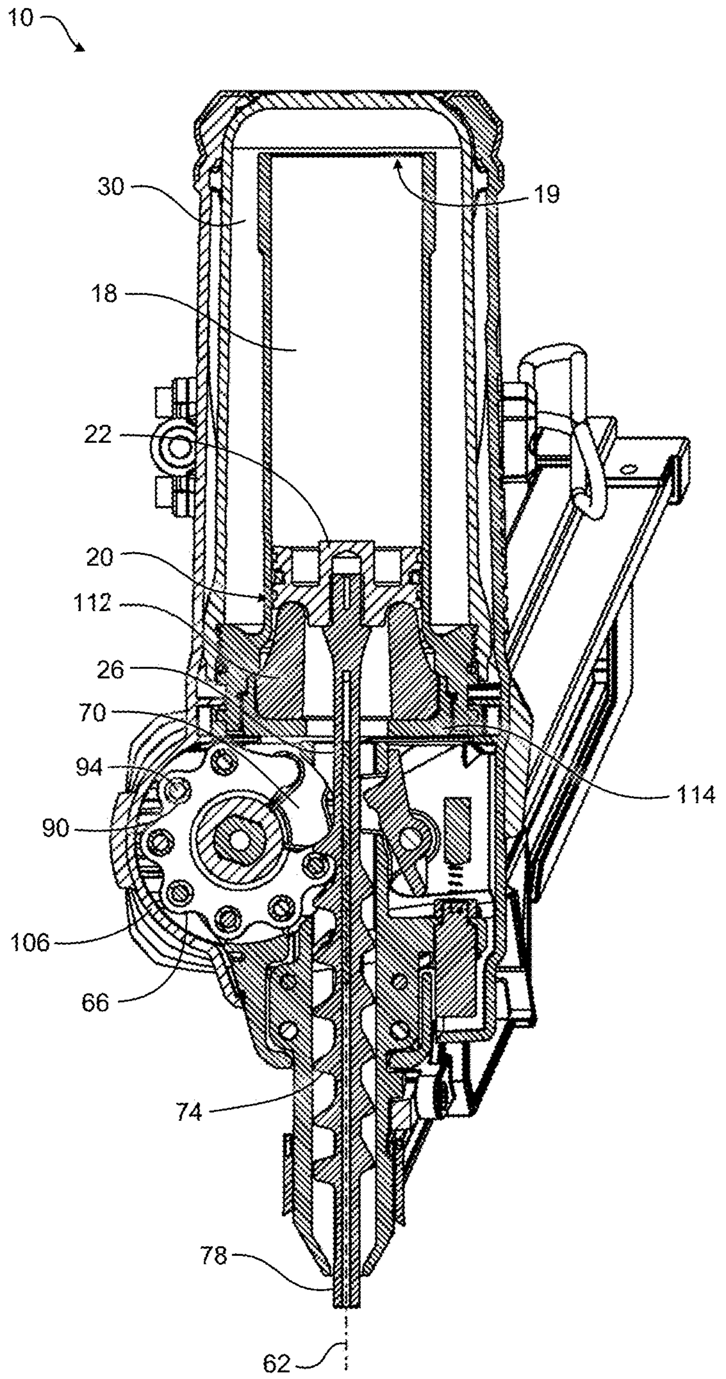
FIG. 2A illustrates a partial cross-sectional view of the power tool of FIG. 1, according to some embodiments.

FIG. 2A illustrates a partial cross-sectional view of the power tool 10 of FIG. 1, according to some embodiments. With reference to FIG. 2A, the nailer 10 does not require an external source of air pressure, but rather includes an outer storage chamber cylinder 30 of pressurized gas in fluid communication with a cylinder 18. In the illustrated embodiment, the cylinder 18 and moveable piston 22 are positioned within the storage chamber cylinder 30. The nailer 10 includes a bumper 112 that is positioned beneath the piston 22 to stop the piston 22 at a driven position and to absorb the impact energy from the piston 22. The bumper 112 is configured to distribute the impact force of the piston 22 uniformly throughout the bumper 112 as the piston 22 is rapidly decelerated upon reaching a driven position (i.e., a bottom-dead-center position). The bumper 112 is disposed in the cylinder 18 and is clamped into place by a drive mechanism or a lifter housing portion 106, which is threaded to the bottom end of the cylinder 18. As shown, the bumper 112 is received within a cutout 114 that is formed in the lifter housing portion 106. The cutout 114 coaxially aligns the bumper 112 relative to a striker or driver blade 26. Although the term driver blade is used herein, the term striker can be interchangeably used in place of driver blade. The driver blade 26 is configured to move with the piston 22 along the same path of motion (e.g., from top-dead-center to bottom-dead-center).

As shown in FIG. 2A, the storage chamber cylinder 30 is concentric with the cylinder 18. The cylinder 18 has an annular inner wall that guides the piston 22 and the driver blade 26 along the driving axis 600 (see FIGS. 6A and 6B) to compress the gas in the storage chamber cylinder 30. The storage chamber cylinder 30 has an annular outer wall circumferentially surrounding the inner wall. The cylinder 18 has a threaded section and the storage chamber cylinder 30 has corresponding threads at a lower end of the storage chamber cylinder 30 such that the cylinder 18 is threadably coupled to the storage chamber cylinder 30 at the lower end. As such, the cylinder 18 is configured to be axially secured to the storage chamber cylinder 30.

As illustrated in FIG. 2A, the driver blade 26 may define a driving axis 62 and include a plurality of driver blade teeth or lift teeth 74 formed along an edge of the driver blade 26, which may extend in the direction of a driving axis 62. In various implementations, the lift teeth 74 project laterally from the edge 78 relative to the driving axis 62. During the drive sequence, the driver blade 26 and the piston 22 are movable along the driving axis 62 between the top-dead-center position and the bottom-dead-center position (e.g., the driven position). In some examples, the driver blade 26 may be held at a ready position, which may be positioned between the top-dead-center and the bottom-dead-center position. The piston 22 may be positioned proximate or adjacent to a top end 19 of the cylinder 18 in the top-dead-center position, and the piston 22 may be positioned proximate or adjacent to a bottom end 20 of the cylinder 18 in the bottom-dead-center position.

The nailer 10 may also include a rotary lifter 66 supported within the lifter housing portion 106. The rotary lifter 66 may include a plurality of rollers 90 supported by a plurality of pins 94. The lifter 66 may be supported on a lifter frame 70 and may receive torque from an electric motor, which causes the lifter 66 to rotate. As the lifter 66 rotates (e.g., when driven by the electric motor) the rollers 90 engage the lift teeth 74 formed on the driver blade 26 to return the driver blade 26 along the driving axis 62 from the bottom-dead-center position to the top-dead-center position.

Figure 2B:
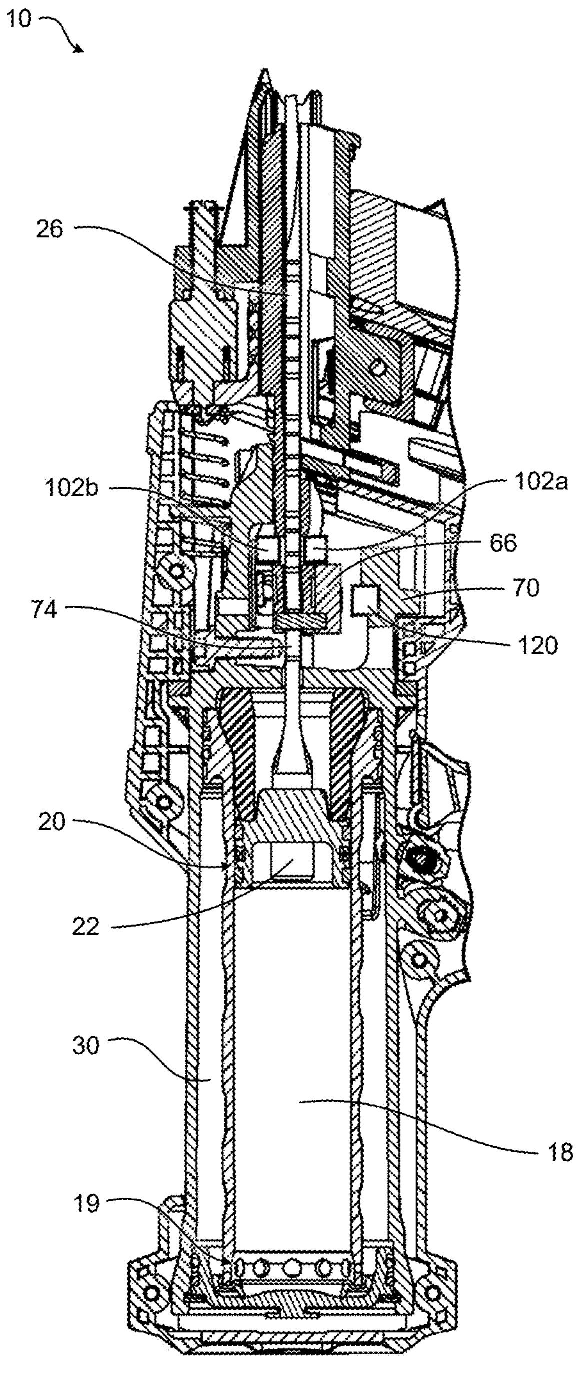
FIG. 2B illustrates a partial cross-section of the power tool of FIG. 1, according to some embodiments.

FIG. 2B illustrates a partial cross-section of the power tool 10 of FIG. 1, according to some embodiments. As illustrated in the example of FIG. 2B, in various implementations, the nailer 10 includes one or more sensors that may be used to directly detect or estimate a position of the driver blade 26. In some examples, the one or more sensors include one or more blade sensors 102 configured to monitor a position of the driver blade 26. In various implementations, the one or more sensors include one or more lifter sensors 120 configured to monitor a position of the rotary lifter 66. In various implementations, blade sensors 102 monitor the movement of the lift teeth 74, which allows a controller to use the sensor signals to determine the position of the driver blade 26 as it moves between the top-dead-center (or ready) and bottom-dead-center positions. For example, blade sensors 102 may include a phototransistor 102*a* coupled to the lifter frame 70 on a first side of the driver blade 26 and a light emitter 102*b* an opposite side of the driver blade 26. As the driver blade 26 moves, the lift teeth 74 pass through the beam of light (such as, for example, a laser beam, an infrared beam, etc.) emitted by the optical sensor 102 (e.g., from the light emitter 102*b* to the phototransistor 102*a*). By measuring the time intervals during which the beam is blocked, a controller can compute the position of the driver blade 26.

In various implementations, the blade sensors 102 include any combination of one or more inductive sensors, capacitive sensors, magnetic sensors (such as, for example, Hall effect sensors, anisotropic magnetoresistance sensors, tunneling magnetoresistance sensors, giant magnetoresistance sensors, etc.), and/or absolute or relative position sensors such as encoders. For example, inductive sensors may detect a presence of the lift teeth 74 by monitoring changes in inductance as the lift teeth 74 move past the sensor. Similar to the optical sensors 102*a* and 102*b*, the controller can monitor the number and timing of the lift teeth 74 passing by, which can be used to determine the position of the driver blade 26. Capacitive sensors may monitor changes in capacitance as the lift teeth 74 move past the sensors. As with the previous sensors, the controller can monitor the number and timing of the lift teeth 74 passing by, which can be used to determine the position of the driver blade 26. Magnetic sensors may monitor changes in the magnetic field as the lift teeth 74 move past the sensors. As with the previous sensors, the controller can monitor the number and timing of the lift teeth 74 passing by, which can be used to determine the position of the driver blade 26.

In some examples, the nailer 10 includes a lifter sensor 120 coupled to the lifter frame 70 and positioned to detect an angular position of the lifter 66. The position of the lifter 66 may be directly related to the position of the driver blade 26. Accordingly, the controller may determine the position of the driver blade 26 based on the angular position data from the lifter sensor 120.

Figure 2C:
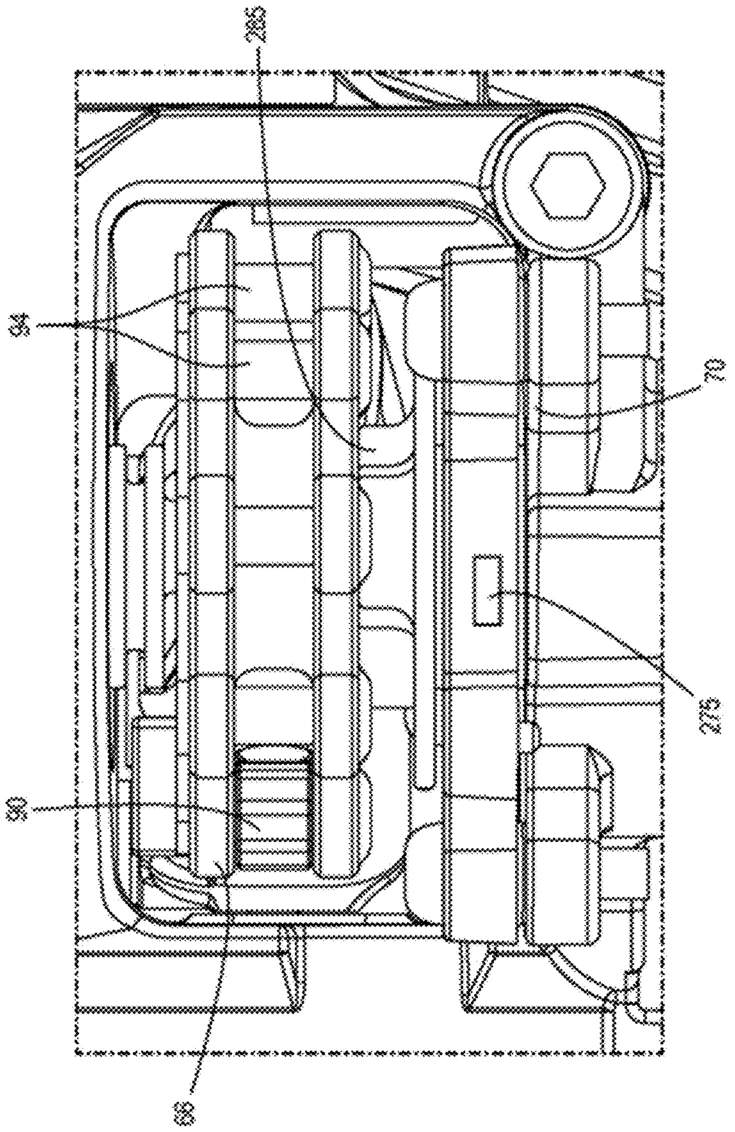
FIG. 2C is a side view of a portion of the power tool of FIG. 1 with portions removed to illustrate a rotary lifter and a lifter sensor, according to some embodiments.
Figure 2D:
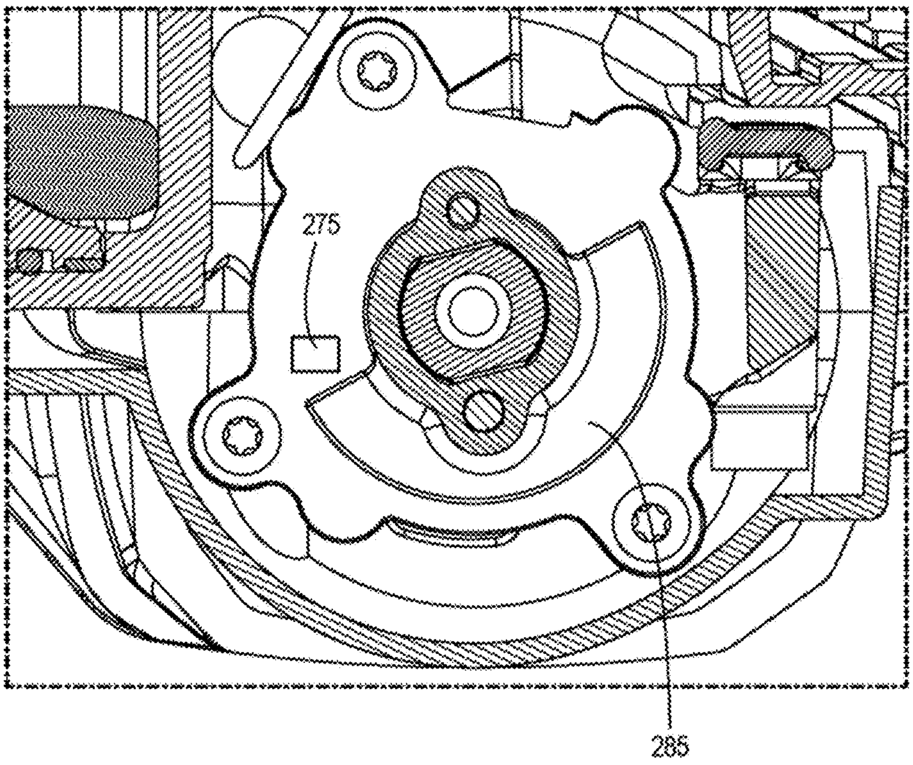
FIG. 2D is a top view of a portion of the power tool of FIG. 1 with portions removed to illustrate a lifter sensor, according to some embodiments.

FIG. 2C is a side view of a portion of the power tool 10 of FIG. 1 with portions removed to illustrate the rotary lifter 66 and the lifter sensor 120, according to some embodiments. FIG. 2D is a top view of a portion of the power tool 10 of FIG. 1 with portions removed to illustrate the lifter sensor 120, according to some embodiments. Referring collectively to FIGS. 2C and 2D, in various implementations, the lifter sensor 120 includes an inductive sensor 275 coupled to the lifter frame 70 and a sensor target 275 coupled for co-rotation with the lifter 66. Thus, the sensor target 285 rotates with the lifter 66. As the lifter 66 rotates, the sensor target 275 passes by the inductive sensor 275, which detects the position of the sensor target 285 based on changes in the magnetic field, for example. Because the sensor target 275 is coupled for co-rotation with the lifter 66, the readings of the sensor target 275 provide data corresponding to the angular position of the lifter 66. This angular position data may be directly related to the position of the driver blade 26. Accordingly, the controller may determine the position of the driver blade 26 based on the angular position data from the inductive sensor 275.

In various implementations, the lifter sensors 120 include any combination of one or more inductive sensors, capacitive sensors, magnetic sensors (such as, for example, Hall effect sensors, anisotropic magnetoresistance sensors, tunneling magnetoresistance sensors, giant magnetoresistance sensors, etc.), and/or absolute or relative position sensors such as encoders. In some examples, the controller processes sensor data from a combination of the optical sensors 102, inductive sensors, capacitive sensors, magnetic sensors, lifter sensor 120, and/or inductive sensor 275 and determines the position of the driver blade 26 based on a combination of sensor data.

Figure 3:
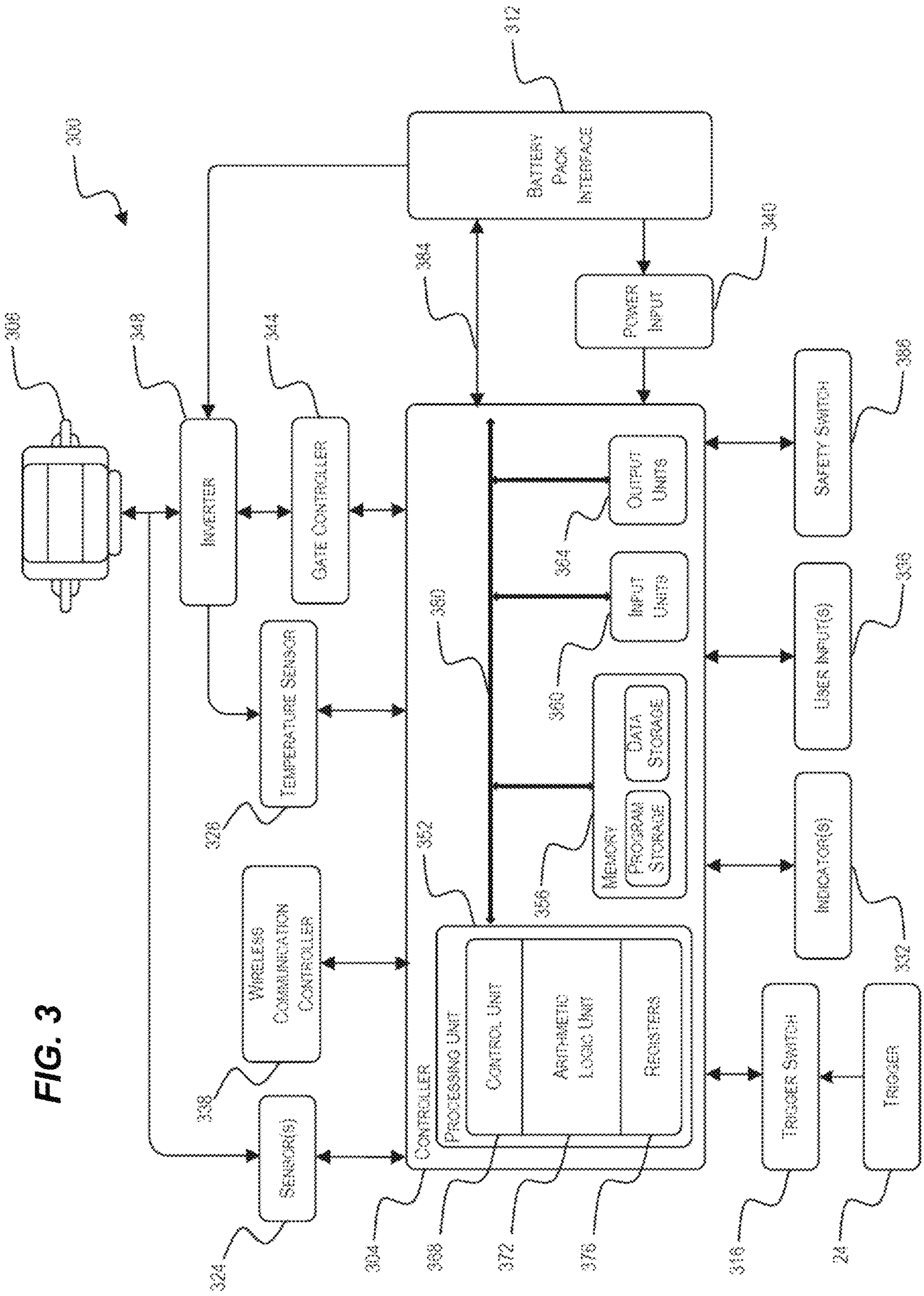
FIG. 3 illustrates a control system for the power tool of FIG. 1, according to some embodiments.

FIG. 3 illustrates an example control system 300 for the nailer 10. The control system 300 includes a controller 304. The controller 304 may be electrically and/or communicatively connected to a variety of modules or components of the nailer. For example, the illustrated controller 304 is electrically connected to a motor 308 (e.g., see motor 815 in FIGS. 9A and 9B), a battery pack interface 312, a trigger switch 316 (connected to a trigger 24), one or more sensors 324 (e.g., any combination of the previously described blade sensors 102, inductive sensors, capacitive sensors, magnetic sensors, lifter sensor 120, and/or inductive sensor 275) and a temperature sensor 328, a wireless communication controller 338, one or more indicators 332, one or more user input modules 336 connected to mode selector 32, a safety switch 386 connected to safety 28, a power input module 340, and a gate controller 344 (connected to an inverter 348). The motor 308 includes a rotor, a stator, and a shaft that rotates about a longitudinal axis.

The controller 304 includes combinations of hardware and software that are operable to, among other things, control the operation of the nailer 10, monitor the operation of the nailer 10, activate the one or more indicators 332 (e.g., an LED), etc. The gate controller 344 is configured to control the inverter 348 to convert a DC power supply to phase signals for powering the phases of the motor 308. The current sensor 324 is configured to, for example, sense a current between the inverter 348 and the motor 308. The temperature sensor 328 is configured to, for example, sense a temperature of the inverter 348. In some implementations, the temperature sensor 328 is configured to, for example, sense a temperature of the rechargeable battery pack 12.

The controller 304 includes a plurality of electrical and electronic components that provide power, operational control, and protection to the components and modules within the controller 304 and/or the nailer 10. For example, the controller 304 includes, among other things, a processing unit 352 (e.g., a microprocessor, a microcontroller, an electronic processor, an electronic controller, or another suitable programmable device), a memory 356, input units 360, and output units 364. The processing unit 352 includes, among other things, a control unit 368, an arithmetic logic unit ("ALU") 372, and a plurality of registers 376 (shown as a group of registers in FIG. 3), and is implemented using a known computer architecture (e.g., a modified Harvard architecture, a von Neumann architecture, etc.). The processing unit 352, the memory 356, the input units 360, and the output units 364, as well as the various modules or circuits connected to the controller 304 are connected by one or more control and/or data buses (e.g., common bus 380). The control and/or data buses are shown generally in FIG. 3 for illustrative purposes. The use of one or more control and/or data buses for the interconnection between and communication among the various modules, circuits, and components would be known to a person skilled in the art in view of the invention described herein.

The memory 356 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 352 is connected to the memory 356 and executes software instructions that are capable of being stored in a RAM of the memory 356 (e.g., during execution), a ROM of the memory 356 (e.g., on a generally permanent basis), or another non-transitory computer readable medium such as another memory or a disc. Software included in the implementation of the nailer 10 can be stored in the memory 356 of the controller 304. The software includes, for example, firmware, one or more applications, program data, filters, rules, one or more program modules, and other executable instructions. The controller 304 is configured to retrieve from the memory 356 and execute, among other things, instructions related to the control processes and methods described herein. In other constructions, the controller 304 includes additional, fewer, or different components.

The battery pack interface 312 includes a combination of mechanical components (e.g., rails, grooves, latches, etc.) and electrical components (e.g., one or more terminals) configured to and operable for interfacing (e.g., mechanically, electrically, and communicatively connecting) the nailer 10 with a battery pack. For example, power provided by the battery pack to the nailer is provided through the battery pack interface 312 to the power input module 340. The power input module 340 includes combinations of active and passive components to regulate or control the power received from the battery pack prior to power being provided to the controller 304. The battery pack interface 312 also supplies power to the inverter 348 to be switched by the switching FETs to selectively provide power to the motor 308. The battery pack interface 312 also includes, for example, a communication line 384 to provide a communication line or link between the controller 304 and the battery pack.

The indicators 332 include, for example, one or more light-emitting diodes ("LEDs"). The indicators 332 can be configured to display conditions of, or information associated with, the nailer 10. For example, the indicators 332 are configured to indicate measured electrical characteristics of the nailer 10, the status of the device, etc. The one or more user input modules 336 may be operably coupled to the controller 304 to, for example, select a forward mode of operation or a reverse mode of operation, a torque and/or speed setting for the nailer 10 (e.g., using torque and/or speed switches), etc. In some embodiments, the one or more user input modules 336 may include a combination of digital and analog input or output devices required to achieve a desired level of operation for the nailer, such as one or more knobs, one or more dials, one or more switches, one or more buttons, etc. In some embodiments, the one or more user input modules 336 may receive signals wirelessly from a device external to the nailer 10 (e.g., a user's mobile phone).

The controller 304 may be configured to determine whether a fault condition of the nailer 10 is present and generate one or more control signals related to the fault condition. For example, the controller 304 may calculate or include, within memory 356, predetermined operational threshold values and limits for operation of the nailer 10. For example, when a potential thermal failure (e.g., of a FET, the motor 308, etc.) is detected or predicted by the controller 304, power to the motor 308 can be limited or interrupted until the potential for thermal failure is reduced. If the controller 304 detects one or more such fault conditions of the nailer or determines that a fault condition of the nailer 10 no longer exists, the controller 304 may be configured to provide information and/or control signals to another component of the nailer 10 (e.g., the battery pack interface 312, the indicators 332, etc.). The signals can be configured to, for example, trip or open a high impedance trace of the nailer, reset a switch, etc.

The controller 304 may be configured to determine a state-of-charge ("SOC") the rechargeable battery pack 12. The controller 304 may also be configured to receive signals from a monitoring circuit (e.g., including sensors 324, etc.) that is configured to sense the SOC level, or voltage value, of battery cells of the rechargeable battery pack 12, and transmit the voltage readings to the controller 304. The voltage level of the battery cells may be determined by, for example, measuring the total open circuit voltage of the battery cells or by summing the voltage measurements of each battery cell. In some embodiments, the monitoring circuit is additionally configured to sense a discharge current of the battery cells (e.g., using a current sensor) and/or a temperature of the rechargeable battery pack 12 (e.g., using a temperature sensor) and transmit the sensed current and/or temperature readings to the controller 304. The monitoring circuit is further configured to receive commands from the controller 304 during operation of the nailer 10. In some embodiments, the SOC, a sensed current, and or a sensed temperature, of the rechargeable battery pack 12 is determined by the battery pack 12 and communicated to the power tool 10.

Figure 4:
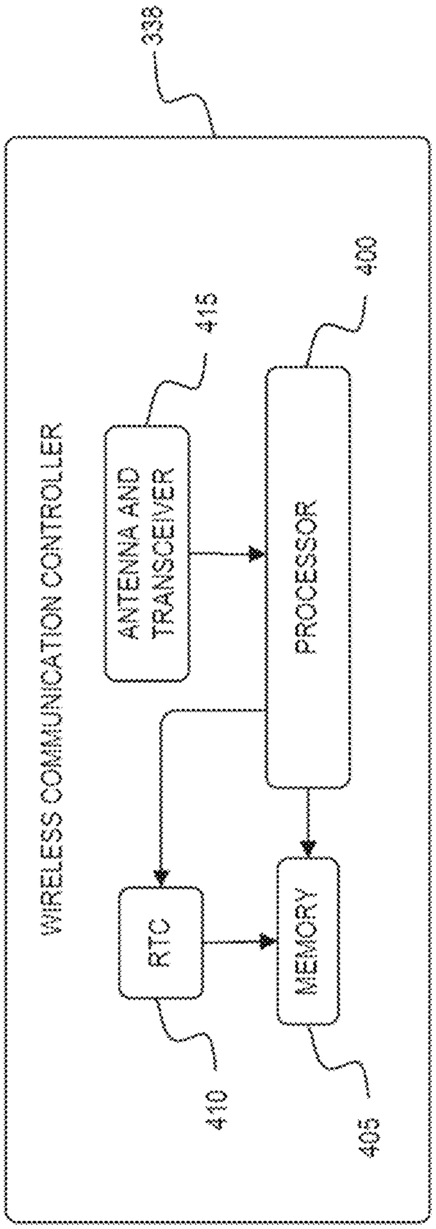
FIG. 4 illustrates a wireless communication controller for the power tool of FIG. 1, according to some embodiments.

FIG. 4 provides an illustration of the wireless communication controller 338 that includes a processor 400, a memory 405, a real-time clock ("RTC") 410, and an antenna and transceiver 415. The wireless communication controller 338 enables the nailer 10 to communicate with an external device 505 (see, e.g., FIG. 5). The radio antenna and transceiver 415 operate together to send and receive wireless messages to and from the external device 505 and the processor 400. The memory 405 can store instructions to be implemented by the processor 400 and/or may store data related to communications between the nailer 10 and the external device 505 or the like. The RTC 410 can increment and keep time independently of the other device components. The RTC 410 can receive power from the battery pack 12 when the battery pack 12 is connected to the nailer 10. The processor 400 for the wireless communication controller 338 controls wireless communications between the nailer 10 and the external device 505. For example, the processor 400 associated with the wireless communication controller 338 buffers incoming and/or outgoing data, communicates with the controller 304, and determines the communication protocol and/or settings to use in wireless communications. The communication via the wireless communication controller 338 can be encrypted to protect the data exchanged between the nailer 10 and the external device 505 from third parties.

In the illustrated embodiment, the wireless communication controller 338 is a Bluetooth® controller. The Bluetooth® controller communicates with the external device 505 employing the Bluetooth® protocol. Therefore, in the illustrated embodiment, the external device 505 and the nailer 10 are within a communication range (i.e., in proximity) of each other while they exchange data. In other embodiments, the wireless communication controller 338 communicates using other protocols (e.g., Wi-Fi, ZigBee, a proprietary protocol, etc.) over different types of wireless networks. For example, the wireless communication controller 338 may be configured to communicate via Wi-Fi through a wide area network such as the Internet or a local area network, or to communicate through a piconet (e.g., using infrared or NFC communications).

In some embodiments, the network is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, 5G New Radio, a Digital Enhanced Cordless Telecommunications ("DECT") network, a Digital AMPS ("IS-136/TDMA") network, or an Integrated Digital Enhanced Network ("iDEN") network, etc.

The wireless communication controller 338 is configured to receive data from the controller 304 and relay the information to the external device 505 via the antenna and transceiver 415. In a similar manner, the wireless communication controller 338 is configured to receive information (e.g., configuration and programming information) from the external device 505 via the antenna and transceiver 415 and relay the information to the controller 304.

Figure 5:
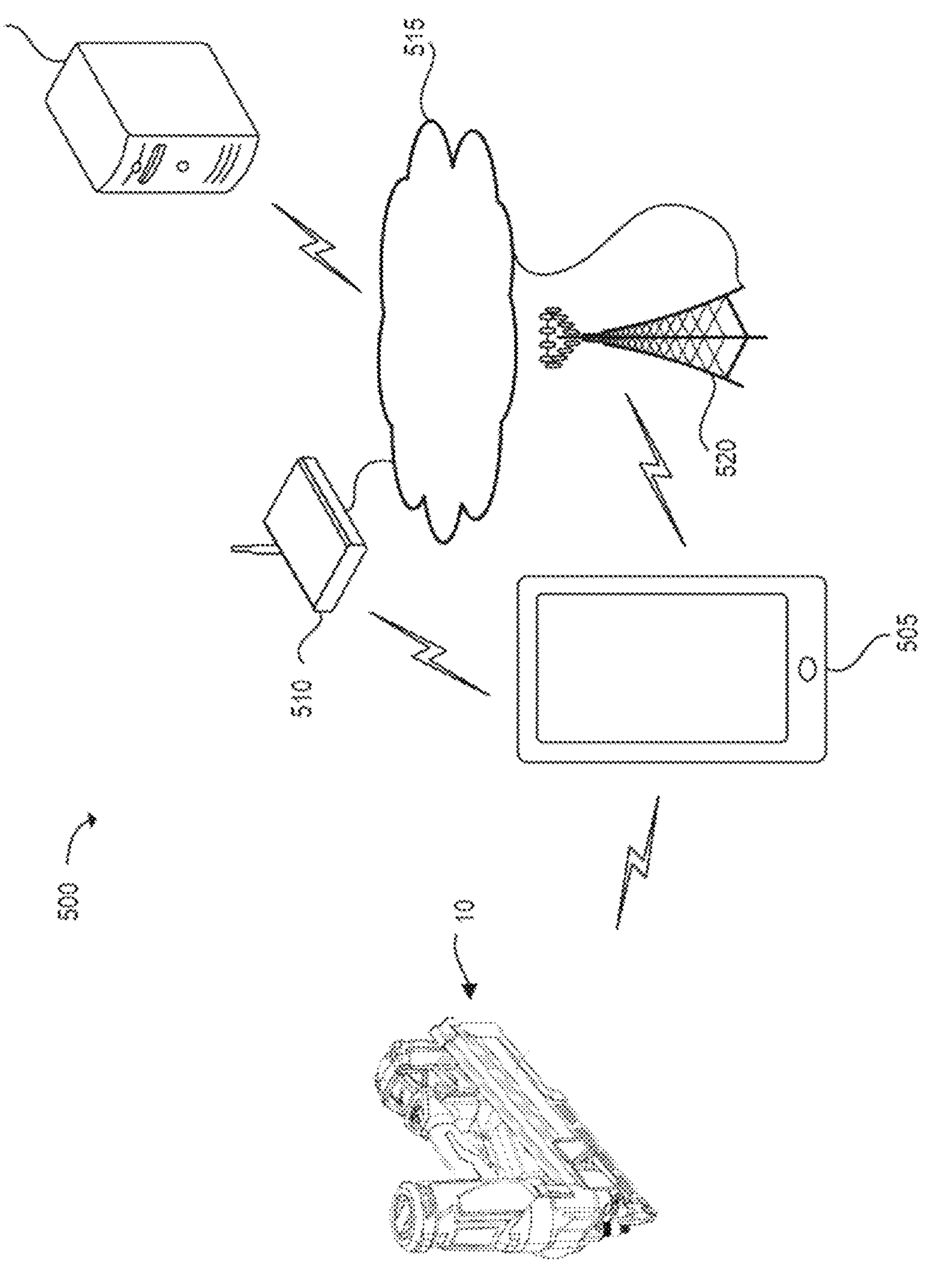
FIG. 5 illustrates a communication system for the power tool of FIG. 1 and an external device, according to some embodiments.

FIG. 5 illustrates a communication system 500. The communication system 500 includes at least one power tool device (e.g., illustrated as the nailer 10) and the external device 505. The nailer 10 and the external device 505 can communicate wirelessly while they are within a communication range of each other. The nailer 10 may communicate a status, operation statistics, sensor data, stored usage information, and the like associated with the nailer 10. Although the nailer 10 is illustrated, any other type of power tool can be provided with the same or similar communications capabilities.

More specifically, the nailer 10 can monitor, log, and/or communicate various operational parameters. The external device 505 can also transmit data to the nailer 10 for operational configuration, firmware updates, or to send commands. The external device 505 also allows a user to set operational parameters, safety parameters, select tool modes, and the like for the nailer 10.

The external device 505 is, for example, a smart phone (as illustrated), a laptop computer, a tablet computer, a personal digital assistant ("PDA"), or another electronic device capable of communicating wirelessly with the nailer 10 and providing the user interface. The external device 505 provides the user interface and allows a user to access and interact with the nailer 10. The external device 505 can receive user inputs to determine operational parameters, enable or disable features, and the like. The user interface of the external device 505 provides an easy-to-use interface for the user to control and customize operation of the nailer 10 or a different type of power tool.

In addition, as shown in FIG. 5, the external device 505 can also share the operational data obtained from the nailer 10 with a remote server 525 connected through a network 515. The remote server 525 may be used to store the operational data obtained from the external device 505, provide additional functionality and services to the user, or a combination thereof. In some embodiments, storing the information on the remote server 525 allows a user to access the information from a plurality of different locations. In some embodiments, the remote server 525 collects information from various users regarding their power tool devices and provide statistics or statistical measures to the user based on information obtained from the different power tools. The network 515 may include various networking elements (routers 510, hubs, switches, cellular towers 520, wired connections, wireless connections, etc.) for connecting to, for example, the Internet, a cellular data network, a local network, or a combination thereof, as previously described. In some embodiments, the nailer 10 is configured to communicate directly with the remote server 525 through an additional wireless interface or with the same wireless interface that the nailer 10 uses to communicate with the external device 505.

Figure 6A:
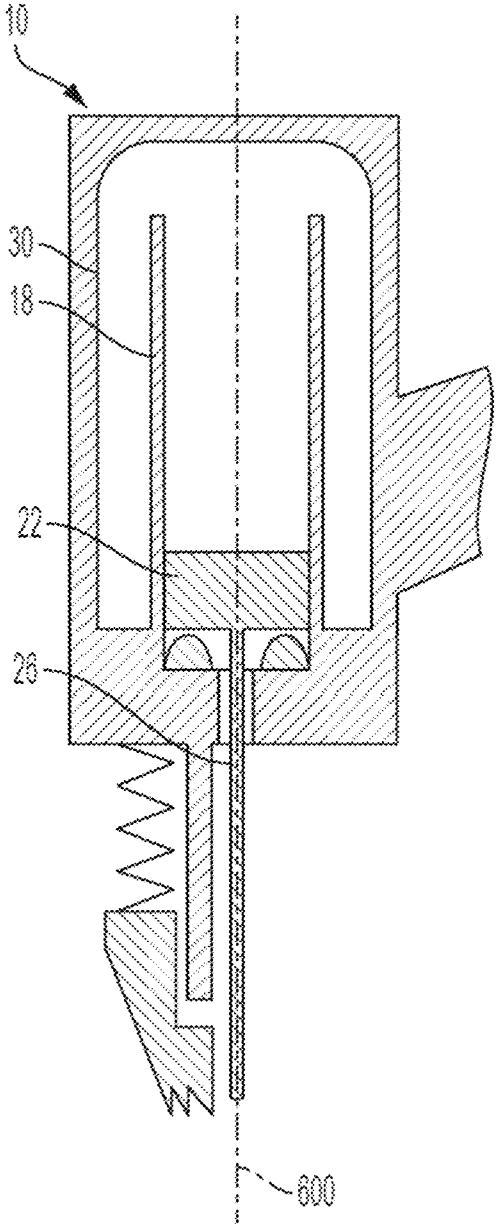
FIG. 6A is a schematic view of the power tool of FIG. 1 illustrating a driver blade in a driven or bottom-dead-center position, according to some embodiments.
Figure 6B:
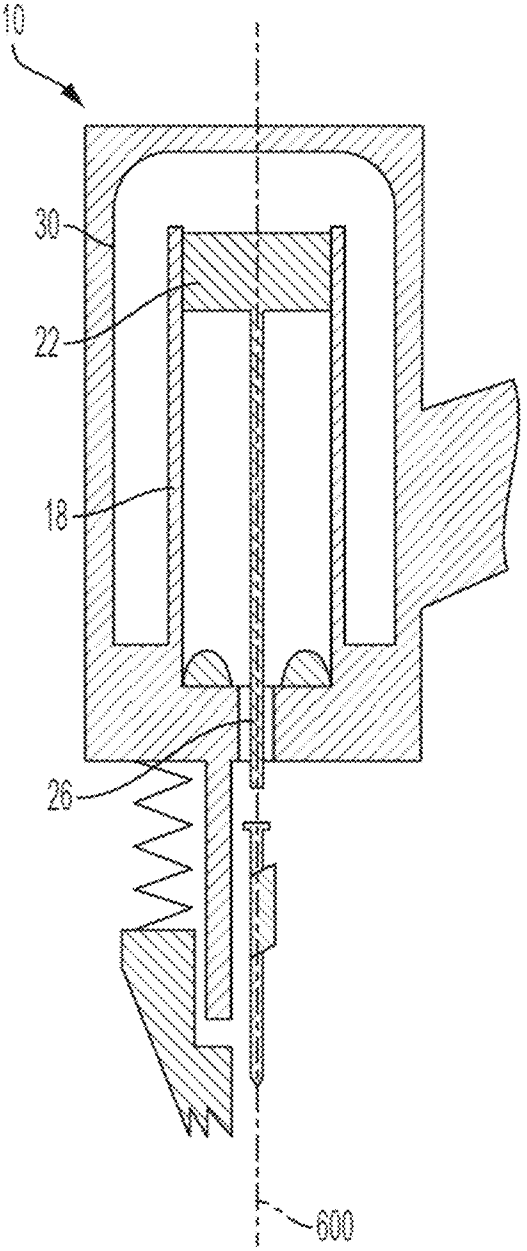
FIG. 6B is a schematic view of the power tool of FIG. 1 illustrating a driver blade in an undriven or top-dead-center position, according to some embodiments.

FIGS. 6A and 6B illustrate partial section views of the nailer 10. As previously described with respect to FIG. 2, the nailer 10 includes the cylinder 18 and the piston 22 positioned within outer storage chamber cylinder 30. The piston 22 is configured to drive the driver blade 26. The nailer 10 does not require an external source of air pressure, and instead includes the outer storage chamber cylinder 30 of pressurized fluid (e.g., gas) in communication with the cylinder 18. The driver blade 26 defines a driving axis 600.

During a drive cycle, the driver blade 26 and the piston 22 are moveable between a top-dead-center ("TDC") position (as shown in FIG. 6B) and a driven or bottom-dead-center ("BDC") position (as shown in FIG. 6A).

In operation, the lifter housing portion 106 drives the piston 22 and the driver blade 26 toward the TDC position by energizing the motor 308 during a retraction cycle. As the piston 22 and the driver blade 26 are driven toward the TDC position, the gas above the piston 22 and the gas within the storage chamber cylinder 30 is compressed. Prior to reaching the TDC position, the motor 308 is deactivated and the piston 22 and the driver blade 26 are held in a ready position, which is located between the TDC and the BDC positions, until being released by user activation of the trigger 24. When released, the compressed gas above the piston 22 and within the storage chamber cylinder 30 drives the piston 22 and the driver blade 26 to the driven position, thereby driving a fastener into the workpiece. The illustrated nailer 10 therefore operates on a gas spring principle utilizing the lifter housing portion 106 and the piston 22 to further compress the gas within the cylinder 18 and the storage chamber cylinder 30.

Figure 7A:
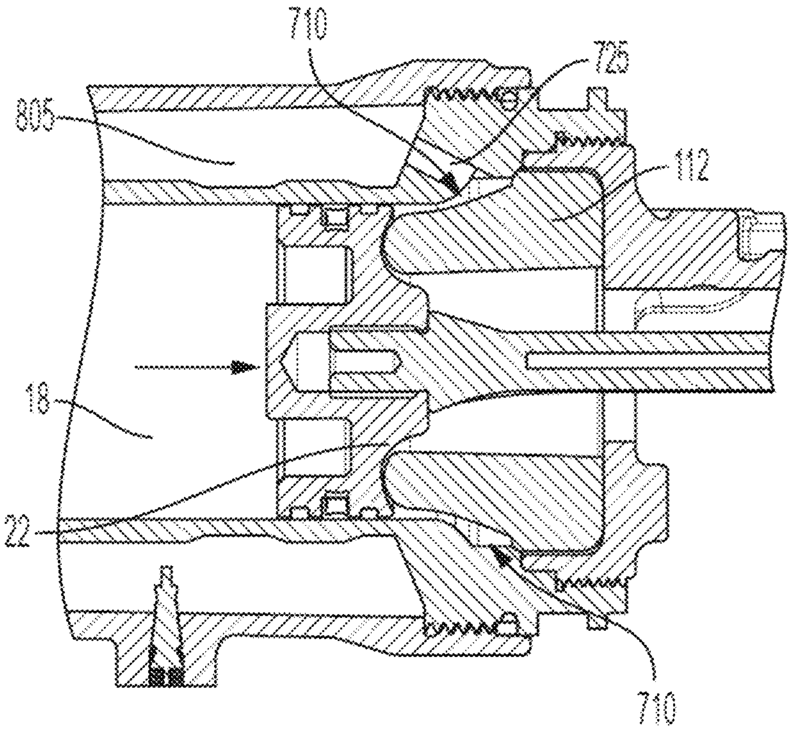
FIG. 7A is an enlarged cross-sectional view of a portion of the power tool illustrating a passageway for supplementing pressure in the power tool, according to some embodiments.
Figure 7B:
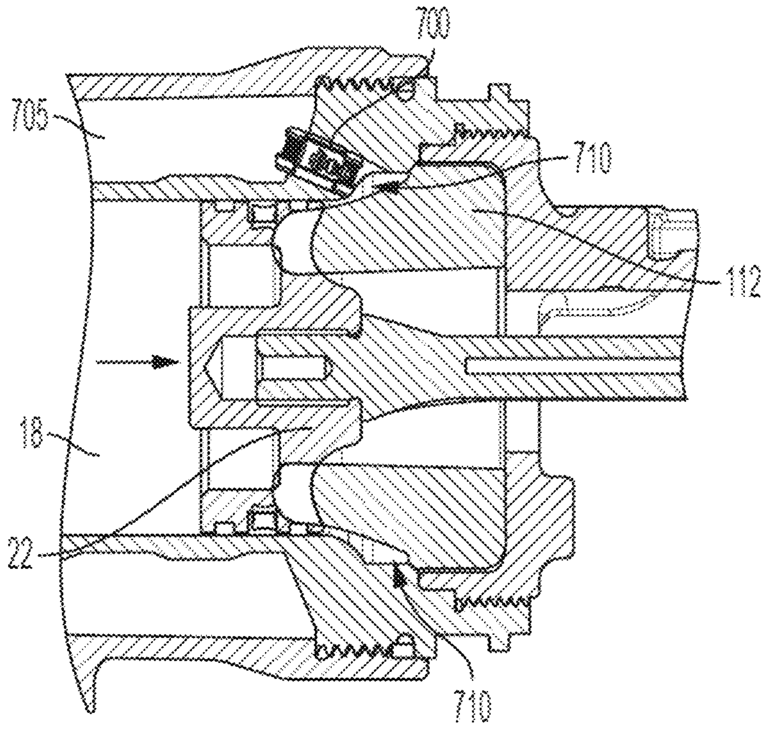
FIG. 7B is an enlarged cross-sectional view of a portion of the power tool similar to FIG. 7A and illustrating a check valve positioned in the passageway, according to some embodiments.

For example, with reference to FIGS. 7A and 7B, the nailer 10 includes a check valve 700 (or similar valve) that is positioned between the bumper 112 and the outer storage chamber cylinder 30 within a passageway 705. The check valve 700 is responsive to pressure as the piston 22 compresses the bumper 112. More specifically, as the piston 22 is driven from the ready position to the driven position, the piston 22 impacts the bumper 112, which seals against the inner cylinder 18 to create an air reservoir or intermediate chamber 710. The intermediate chamber 710 is formed between a bottom portion of the cylinder 18 and the bumper 112 (and in some circumstances, the bumper 112 and the piston 22) when the driver blade 26 approaches the BDC position. That is, the intermediate chamber 710 is completely sealed (i.e., not fluidly connected to the outside atmosphere) when the piston 22 impacts the bumper 112. As the piston 22 compresses the bumper 112, the pressure in the intermediate chamber 710 increases and opens the check valve 700. This increased air pressure through the opened check valve 700 adds a small amount of pressurized air to the outer storage chamber cylinder 30, which results in a higher pressure applied to the cylinder 18 that can compensate for potential or actual air pressure losses in the nailer 10. As such, an increase in air pressure can be generated using bumper compression that occurs at the end of every firing event of the nailer 10. This can avoid, for example, the need for a separate compressor to be attached to the cylinder 18 for increasing the pressure on the piston 22. In effect, the complementary compression of the bumper 112 and the opening of the check valve 700 can form an onboard air compressor for the nailer 10.

By using the repetitive compression of the bumper 112 by the piston 22 to complement the pressure in the storage chamber cylinder 30, a small amount of air pressure (e.g., approximately 0.01-0.015 psi) can be added each time the bumper 112 is compressed by the piston 22. Extrapolating this over 1000 nails fired by the nailer 10, this added pressure equates to approximately 10-15 psi, which is 10-15% of the total tank pressure. While the added pressure is relatively small compared to the total tank pressure, the added pressure facilitated by compression of the bumper 112 and the opened check valve 700 is enough to maintain an adequate tank pressure even after pressure losses are accounted for (e.g., due to permeation, minor debris ingress, or mild mechanical wear).

Figure 8:
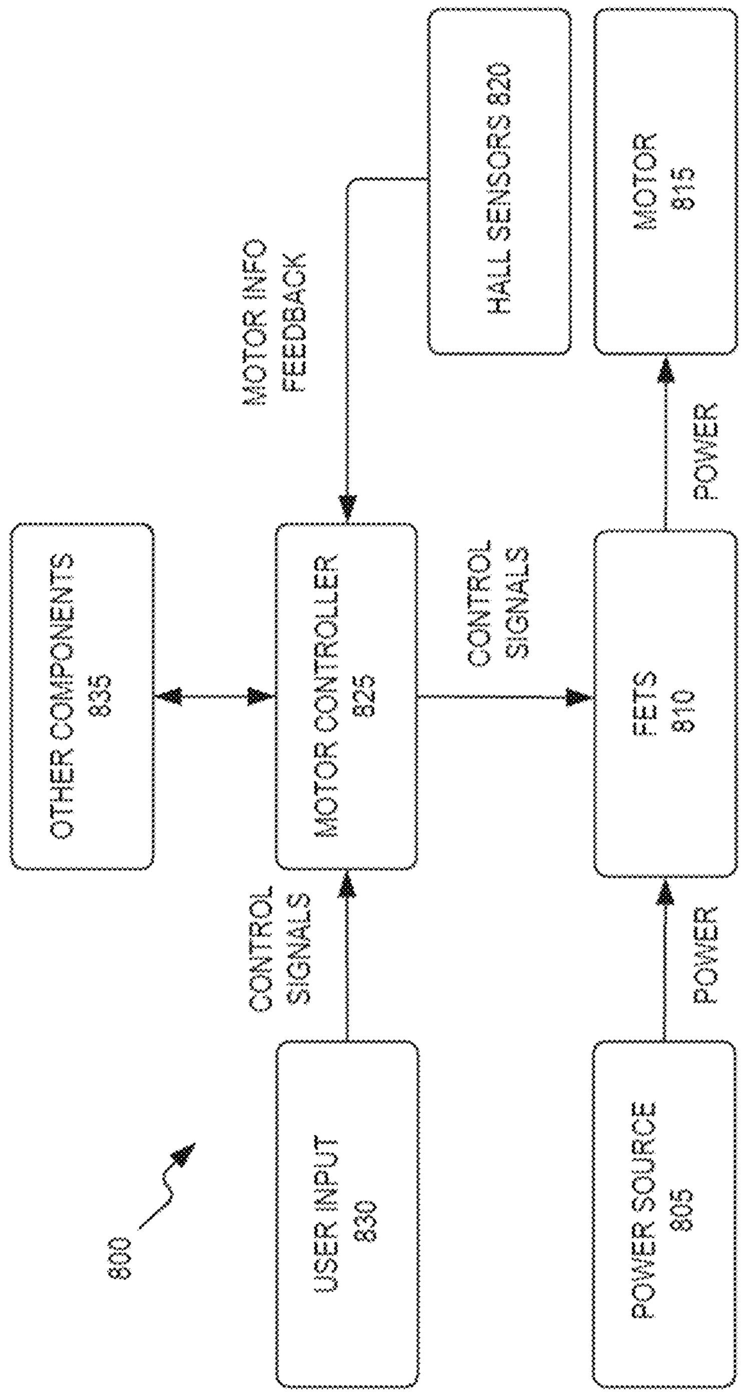
FIG. 8 illustrates a block diagram of a power tool including braking sequences, such as in the power tool of FIG. 1, according to some embodiments.

FIG. 8 illustrates a simplified block diagram of an embodiment 800 of the nailer 10 that implements braking sequences for an electric motor of the nailer 10. The nailer 800 includes a power source 805, switches or Field Effect Transistors ("FETs") 810, a motor 815, Hall effect sensors 820, a motor controller 825 (e.g., controller 304), user input 830, and other components 835 (e.g., a battery pack fuel gauge, work lights (LEDs), current/voltage sensors, etc.). The power source 805 provides DC power to the various components of the nailer 800 and may be a power tool battery pack that is rechargeable and uses, for instance, lithium-ion cell technology (e.g., battery pack 12). In some instances, the power source 805 may receive AC power (e.g., 120V/60 Hz) from a tool plug that is coupled to a standard wall outlet, and then filter, condition, and rectify the received power to output DC power.

Each Hall effect sensor 820 outputs motor feedback information, such as an indication (e.g., a pulse) when a magnet of the rotor rotates across the face of that Hall effect sensor 820. Based on the motor feedback information from the Hall effect sensors 820, the motor controller 825 can determine the position, velocity, and/or acceleration of a rotor of the motor 815. The motor controller 825 also receives user controls from user input 830, such as by depressing the trigger 24. In response to the motor feedback information and user controls, the motor controller 825 transmits control signals to control the FETs 810 to drive the motor 815. By selectively enabling and disabling the FETs 810, power from the power source 805 is selectively applied to stator coils of the motor 815 to cause rotation of the rotor. Although not shown, the motor controller 825 and other components of the nailer 800 are electrically coupled to the power source 805 such that the power source 805 provides power thereto.

Figure 9B:
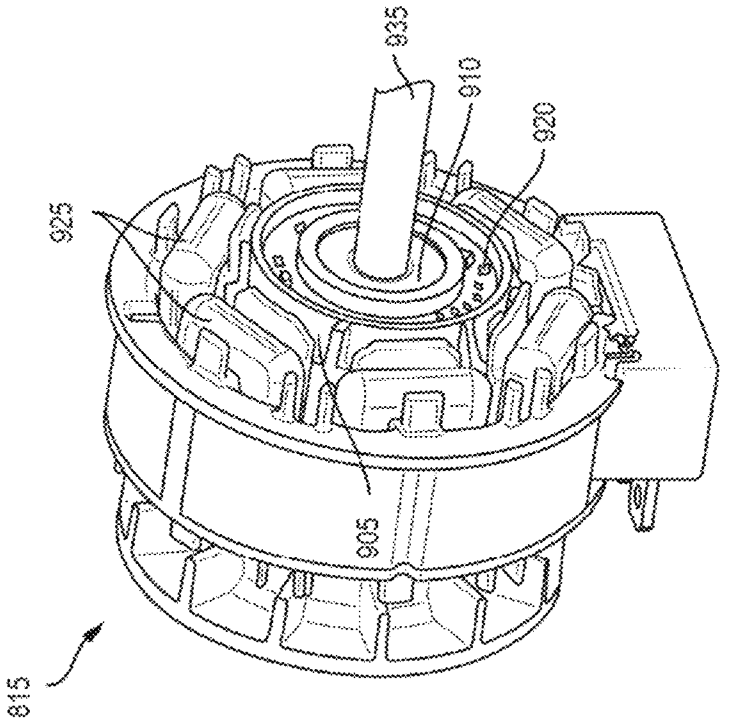
FIGS. 9A-9B illustrate a sensor board of a brushless DC motor incorporated in the power tool of FIG. 1, according to some embodiments.
Figure 9A:
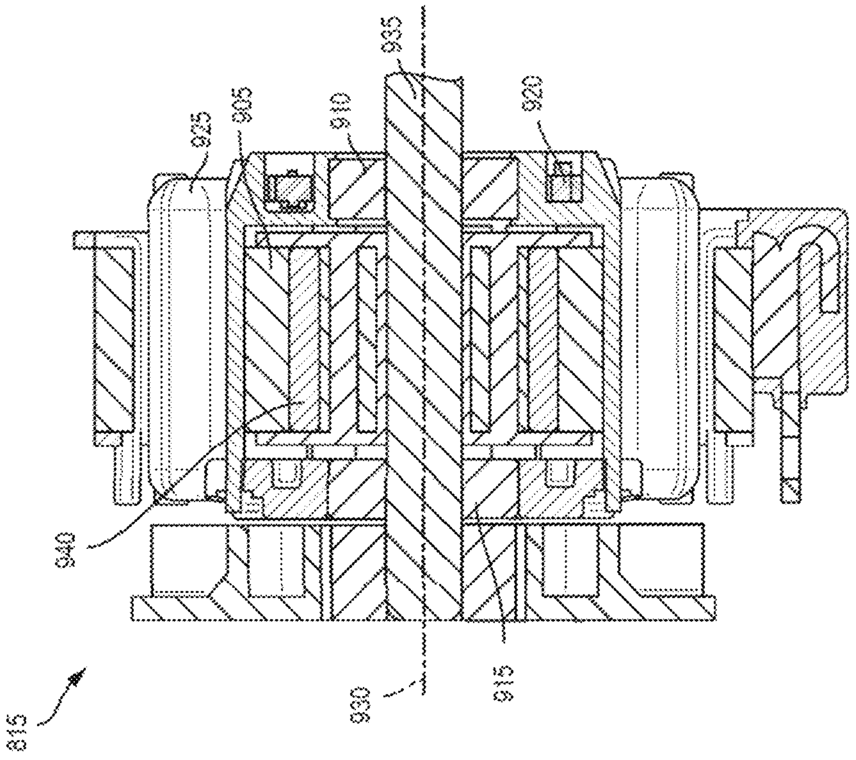

FIGS. 9A and 9B illustrates the motor 815 in the nailer 800. The motor 815 includes a rotor 905, a front bearing 910, a rear bearing 915 (collectively referred to as the bearings 910, 915), a position sensor board assembly 920 within a stator envelope of the motor 815, and a motor shaft 935. Stator coils 925 are parallel to the length of a rotor axis 930. Rotor magnets 940 are brought into proximity of the Hall effect sensors 820 on the position sensor board assembly 920 in order to detect the rotor position. Recessing the rotor 905, the bearings 910, 915, and the position sensor board assembly 920 within the stator envelope allows a more compact motor 815 in the axial direction.

Figure 10A:
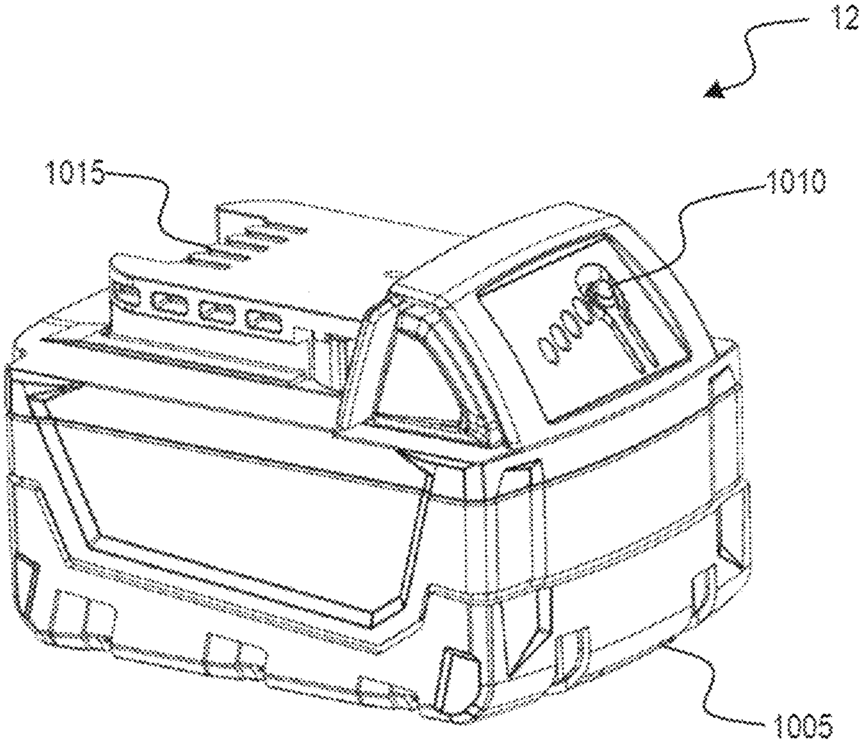
FIG. 10A illustrates a battery pack, according to some embodiments.

FIG. 10A illustrates the rechargeable battery pack 12 according to some embodiments. The rechargeable battery pack 12 includes a housing 1005, a user interface portion 1010 for providing a state-of-charge indication for the rechargeable battery pack 12, and a device interface portion 1015 for connecting the rechargeable battery pack 12 to a device (e.g., a power tool, the nailer 10, etc.). The rechargeable battery pack 12 includes a plurality of battery cells 1020 within the housing 1005.

Figure 10B:
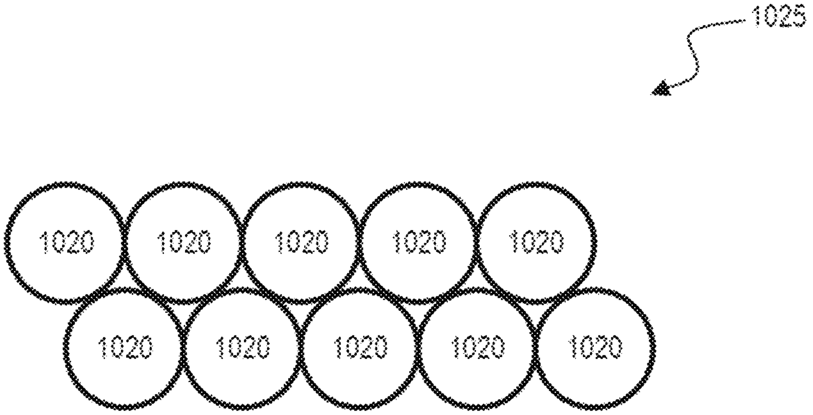
FIG. 10B illustrates a group of battery cells, according to some embodiments.

FIG. 10B illustrates a group 1025 of the battery cells 1020 that include, for example, ten individual battery cells 1020. The battery cells 1020 can be located within the housing 1005 of the rechargeable battery pack 12. In some embodiments, the rechargeable battery pack 12 includes more or fewer than 10 battery cells within the housing 1005.

Figure 11A:
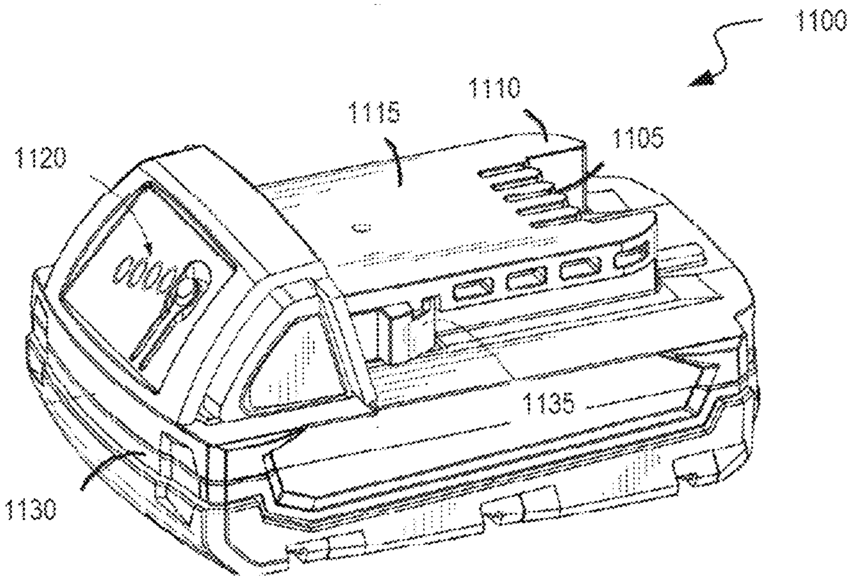
FIG. 11A illustrates a battery pack, according to some embodiments.

FIG. 11A illustrates a battery pack 1100, such as the rechargeable battery pack 12, for powering a power tool. The battery pack 1100 includes a battery housing 1130 and, with reference to FIG. 11B, a plurality of battery cells 1190.

Figure 11B:
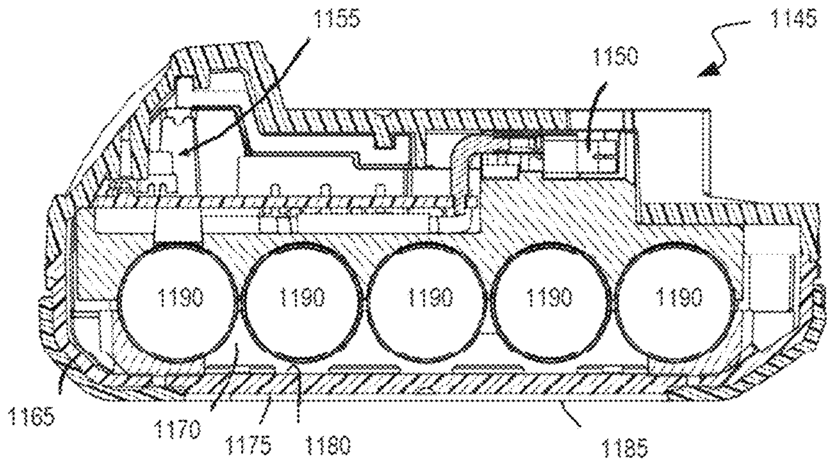
FIG. 11B illustrates a group of battery cells, according to some embodiments.

FIG. 11B illustrates an interior view 1145 containing the battery housing 1130, which includes a wall 1165 having an inside surface 1180 and an outside surface 1175. The inside surface 1180 defines an internal cavity 1170. The outside surface 1175 includes a top surface portion 1115 and a bottom portion 1185. Referring to FIG. 11B, the battery cells 1190 disposed within the cavity 1170 are connected in series to battery contacts 1105. Referring back to FIG. 11A, a plurality of contacts 1105 (FIG. 11B) are disposed on the top surface portion 1115, within a battery contacts housing extension 1110. The housing extension 1110 is configured to matingly engage with one or more power tools or powered accessories. A battery charge level indicator 1120 is also disposed on the housing (FIG. 11A), while additional battery charging, monitoring, and indication components 1155 are disposed within the cavity 1170 (FIG. 11B). As shown in FIG. 11A, two tabs 1135 are coupled to the housing 1130 for releasably securing the housing 1130 to a power tool device. Corresponding features to those described above with respect to the battery pack 1100 can also be included in the rechargeable battery pack 12.

FIGS. 12A-12D are flowcharts of an example process 1200 for controlling operating sequences of power tool 10. At 1202, power tool 10 is powered on. For example, power input module 340 provides DC power to controller 304 and components of control system 300. At 1204, controller 304 monitors for an operating mode selection. In various implementations, user input modules 336 monitors user inputs and determines whether the power tool 10 is in a first operating mode or a second operating mode. In some embodiments, power tool 10 includes one or more switches, such as mode selector 32, that may be toggled to select an operating mode or switched between operating modes. In some examples, power tool 10 includes a graphical user interface output to a display. Users may select between operating modes by interacting with the graphical user interface. User input modules 336 may detect whether the one or more switches have been toggled, one or more positions of the one or more switches, and/or user selections on the graphical user interface to determine whether the first operating mode or second operating mode is selected.

At 1206, controller 304 determines whether the first operating mode is selected. In response to determining that the first operating mode is not selected ("NO" at decision block 1206), controller 304 determines whether the second operating mode is selected at 1208. In response to determining that the second operating mode is not selected ("NO" at decision block 1208), controller 304 continues monitoring for operating mode selection at 1210, for example, by monitoring user input modules 336. From block 1210, process 1200 proceeds back to decision block 1206. In response to determining that the first operating mode is selected ("YES" at decision block 1206), controller 304 is configured to monitor safety switch 386 at block 1212 (see FIG. 12B). At 1214, controller 304 is configured to monitor trigger switch 316. At 1216, controller 304 is configured to determine whether safety switch 386 is activated. In various implementations, safety switch 386 may be activated by the user depressing safety 28. In response to determining safety switch 386 is not activated ("NO" at decision block 1216), controller 304 can continue to monitor safety switch 386 at block 1212 and monitor trigger switch 316 at block 1214. In response to determining safety switch 386 is activated ("YES" at decision block 1216), controller 304 determines whether trigger switch 316 is activated. In various implementations, trigger switch 316 may be activated by the user depressing trigger 24.

In response to determining that trigger switch 316 is not activated ("NO" at decision block 1218), controller 304 can continue to monitor safety switch 386 at block 1212 and monitoring trigger switch 216 at block 1214. In response to determining that trigger switch 316 is activated ("YES" at decision block 1218), controller 304 initiates a drive sequence and drives driver blade 26 from the top-dead-center position (or, in some implementations, from the ready position) to the bottom-dead-center position (for example, according to any of the previously described techniques) at block 1220. At 1222, controller 304 initiates a retraction sequence. For example, controller 304 activates motor 308 to begin retracting driver blade 26 from the bottom-dead-center position to the top-dead-center position (or, in some implementations, to the ready position). At 1224, controller 304 monitors a position of driver blade 26. In various implementations, controller 304 monitors the sensors 324 to determine a position of driver blade 26 (for example, accordingly to any of the previously described techniques). In some examples, controller 304 monitors the sensors 324 to determine a position of the lifter 66 and determines a position of the driver blade 26 based on the position of the lifter 66 (for example, according to any of the previously described techniques).

In some embodiments, controller 304 monitors Hall effect sensors 820 at motor 815 to determine a position of the driver blade 26. The controller 304 may determine how much of the retraction cycle (for example, a percentage of the movement between the bottom-dead-center position and the top-dead-center position or, in some implementations, a percentage of the movement between the bottom-dead-center position and the ready position) has been completed. For example, when rotor magnets 940 pass Hall effect sensors 820, the Hall effect sensors 820 detect a change in the magnetic field produced by the rotor magnets 940. By monitoring a number of Hall transitions, Hall effect sensors 820 may be used to determine a number of revolutions of motor 308, and controller 304 determines a position of driver blade 26 based on how much driver blade 26 has been retracted as a function of motor revolutions. For example, controller 304 may monitor Hall effect sensors 820 and generate a count x of completed motor revolutions during the current retraction cycle. If c revolutions of motor 308 are required to retract driver blade 26 from the bottom-dead-center position to the top-dead-center position, then controller 304 may compute the position of driver blade 26 as percentage y of the retraction cycle according to Equation (1) below:

$$y = \frac{x}{c} \quad (1)$$

At 1226, controller 304 determines whether the position of driver blade 26 has reached or exceeds a threshold. In some examples, the threshold is expressed as a percentage of the retraction cycle completed by driver blade 26. In various implementations, the threshold is in a range of between about 50% to about 100%. In some examples, the threshold may be about 50%, 55%, 60%, 65%, 70%, 75%, 80%, 85%, 90%, 95%, or 100%. In response to determining that the position of driver blade 26 has not reached or exceeded the threshold ("NO" at decision block 1226), controller 304 continues monitoring the position of driver blade 26 at block 1224.

In response to determining that the position of driver blade 26 has reached or exceeded the threshold ("YES" at decision block 1226), controller 304 initiates a braking sequence for motor 308 at block 1228. In some embodiments, motor 308 may be a pulse-width modulation controlled motor, and controller 304 initiates the braking sequence by reducing the duty cycle of the pulse-width modulation signal, which effectively reduces the average voltage supplied to motor 308. In various implementations, controller 304 reverses the polarity of power to motor 308, which generates torque on rotor 905 in a direction opposite the direction in which rotor 905 is rotating.

In some examples, the braking sequence includes a resistor soft braking technique. In the resistor soft braking technique, an additional field-effect transistor (FET) may be used to channel current through a dedicated braking resistor. For example, the additional FET may be connected in parallel with the windings (for example, of the stator coils 925) of the motor 308 and in series with a braking resistor. This configuration allows the additional FET to control when the braking resistor is engaged in the circuit. During normal operation, the additional FET remains off, and the braking resistor is disconnected from the windings of the motor 308. However, during the braking sequence, the controller 304 may switch the additional FET on, connecting the braking resistor to the windings. The current generated by the back electromotive force (back-EMF) of the rotating motor 308 may flow through the braking resistor, which dissipates the energy as heat, thereby slowing down the motor 308. The braking resistor may be sized according to the braking current, which may be set by the voltage of the back-EMF of the rotating motor 308 divided by the sum of the resistance of the motor 308 and the resistance of the braking resistor.

In various implementations, the controller 304 applies a dynamic braking technique, where the back-EMF generated by the motor 308 is directed back into the motor windings, creating a resistive force that slows down the rotor 905. In dynamic braking, the energy generated during the braking may be dissipated as heat in the motor windings or through additional braking resistors. In some examples, the controller 304 applies a regenerative braking technique, where the motor 308 recovers the kinetic energy of the rotor 905 by converting the kinetic energy of the rotor 905 into electrical energy and providing the electrical energy to recharge the battery pack 12. In some examples, the controller 304 may control mechanical brakes, such as friction pads and/or discs, which can be positioned to physically stop the rotation of the rotor 905. After the braking sequence is completed, process 1200 returns to block 1204. In various implementations, the braking sequence includes controller 304 activating a mechanical brake, for example, to secure driver blade 26 in the top-dead-center position.

Figure 12A:
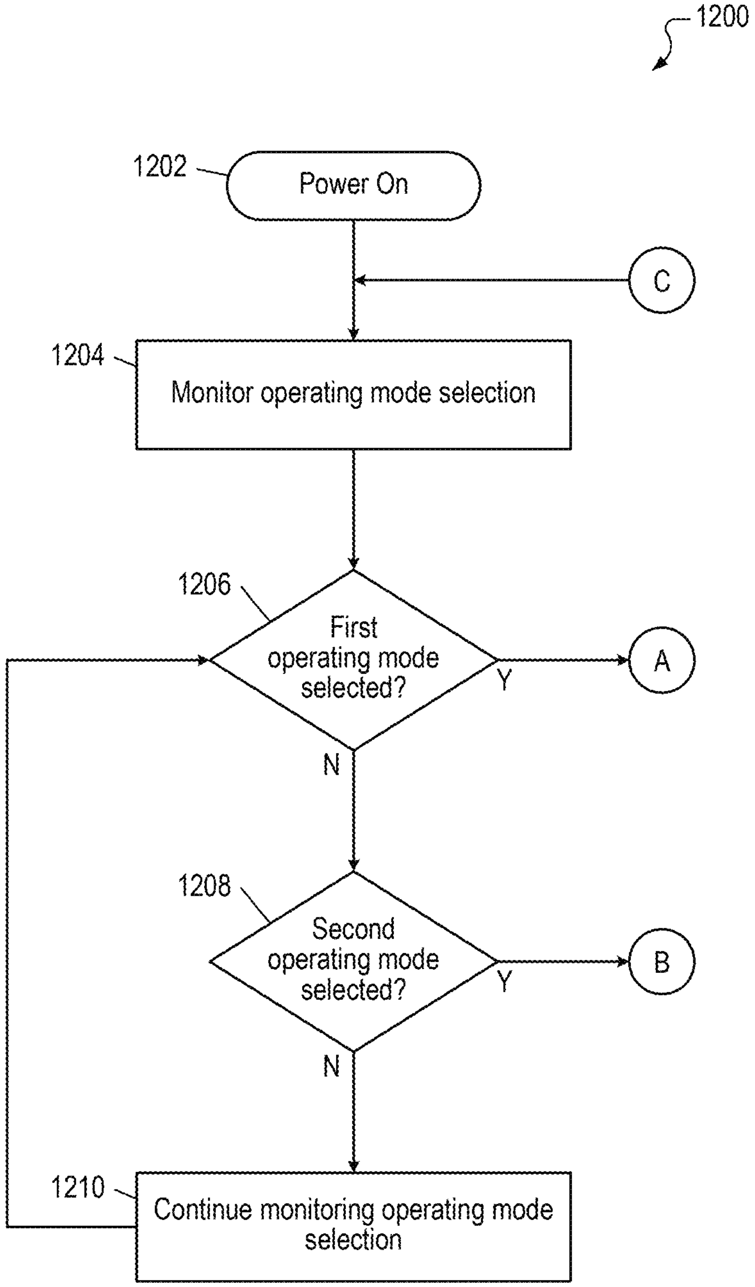
FIGS. 12A-12D are flowcharts of an example process for controlling operating sequences of a power tool, according to some embodiments.
Figure 12B:
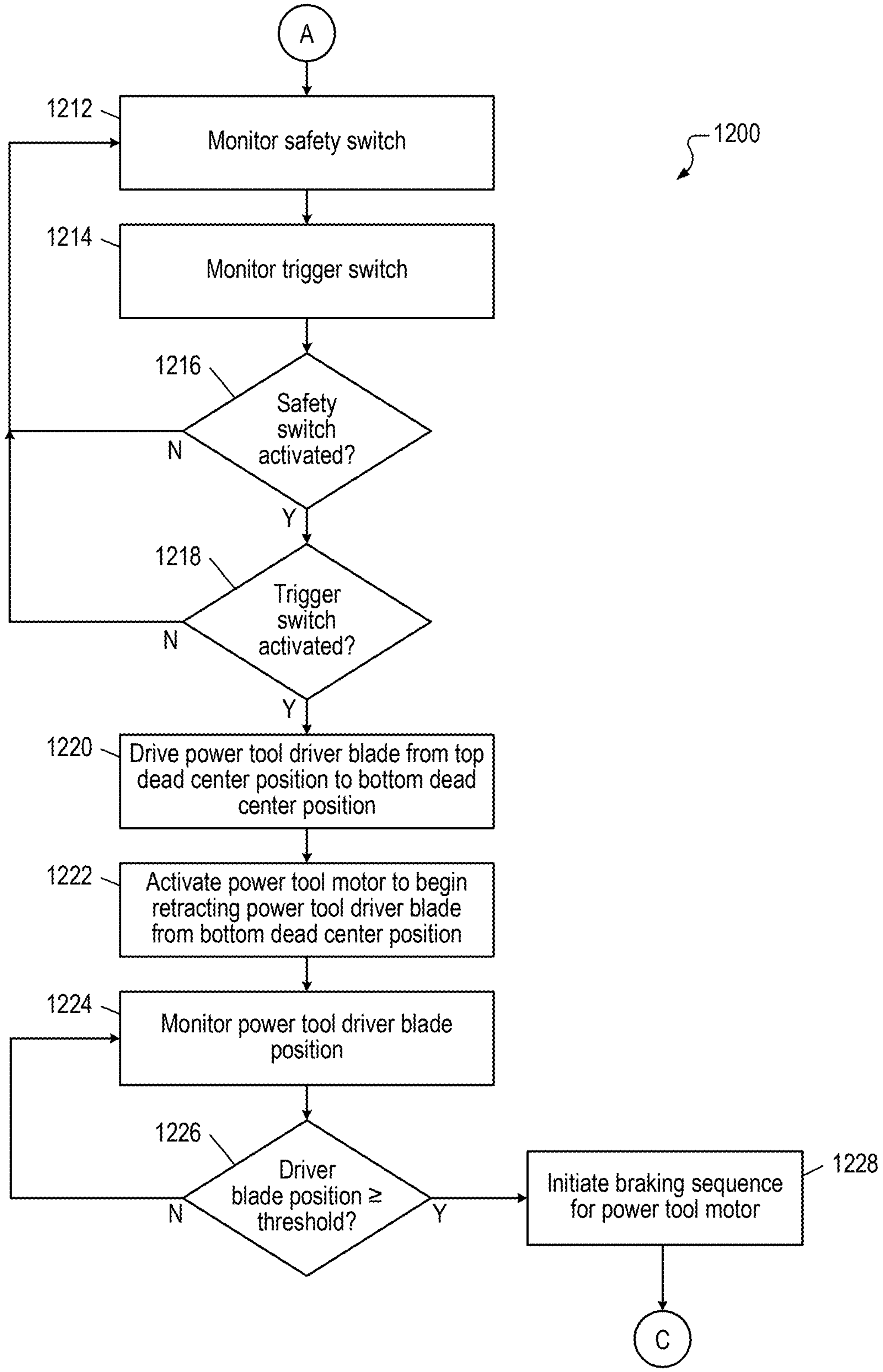
Figure 12C:
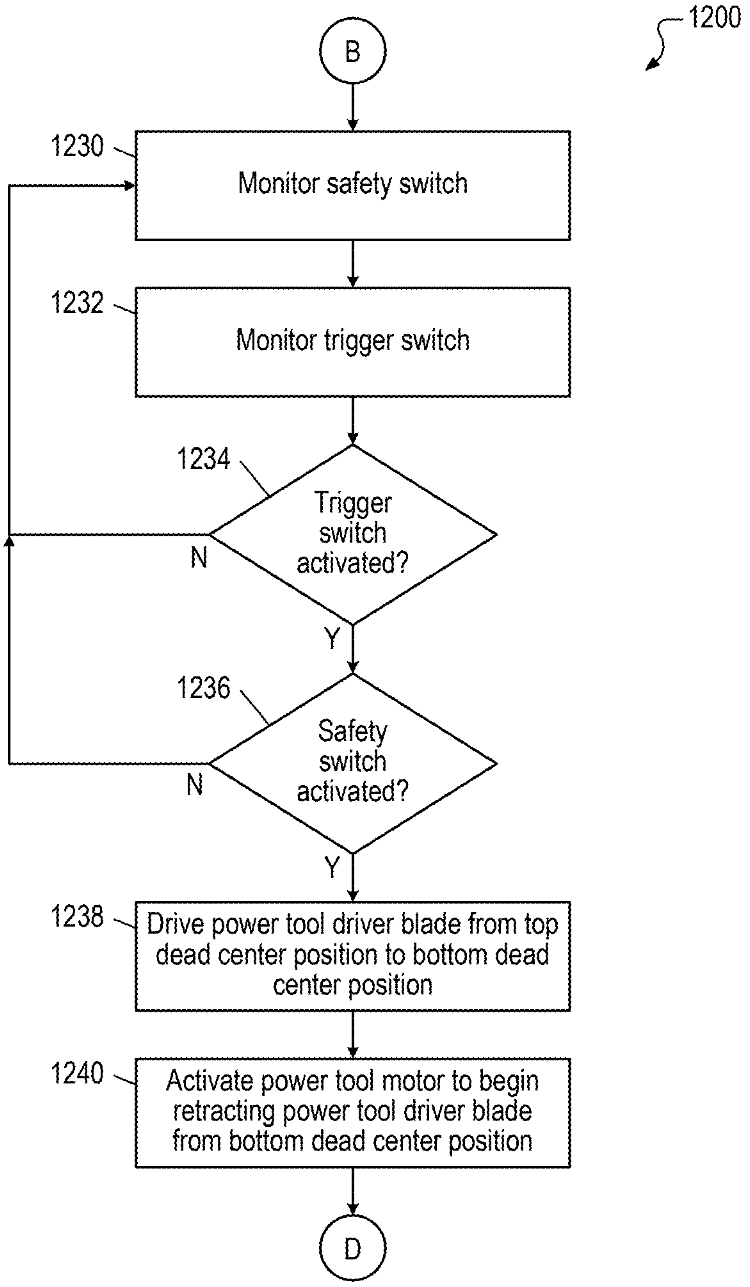
Figure 12D:
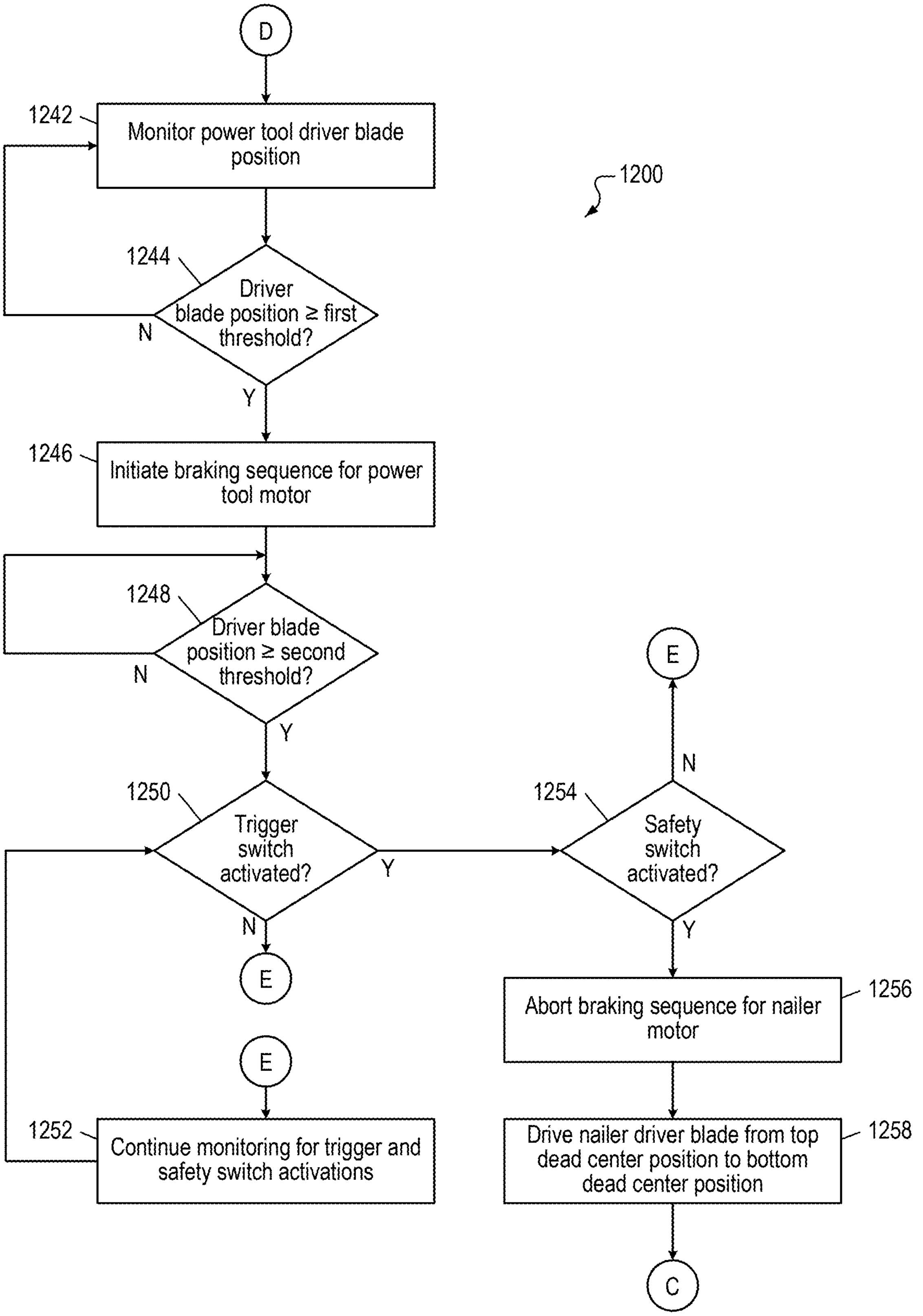

With reference to FIG. 12A, in response to controller 304 determining that the second operating mode is selected ("YES" at decision block 1208), controller 304 is configured to monitor safety switch 386 at block 1230 and trigger switch 316 at block 1232. At 1234 (see FIG. 12C), controller 304 is configured to determine whether trigger switch 316 is activated. In response to determining trigger switch 316 is not activated ("NO" at decision block 1234), controller 304 can continue to monitor safety switch 386 at block 1230 and trigger switch 316 at block 1232. In response to controller 304 determining that trigger switch 316 is activated ("YES" at decision block 1234), controller 304 determines whether safety switch 386 is activated at 1236. In response to controller 304 determining that safety switch 386 has not been activated ("NO" at decision block 1236), controller 304 can continue to monitor safety switch 386 at block 1230 and trigger switch 316 at block 1232. In response to controller 304 determining that safety switch 386 is activated ("YES" at decision block 1236), controller 304 initiates a drive sequence and drives driver blade 26 from the top-dead-center position (or, in some implementations, from the ready position) to the bottom-dead-center position (for example, according to any of the previously described techniques) at block 1238.

At 1240, controller 304 activates motor 308 to begin retracting driver blade 26 from the bottom-dead-center position to the top-dead-center position (or, in some implementations, to the ready position). At 1242, controller 304 is configured to monitor the position of driver blade 26, for example, according to techniques previously described with reference to block 1224, and determine whether the position of driver blade 26 meets or exceeds a first threshold. In some embodiments, the first threshold is in a range of between about 50% to about 100%. For example, the first threshold may be about 50%, 55%, 60%, 65%, 70%, 75%, 80%, 85%, 90%, 95%, or 100%. In response to controller 304 determining that the position of driver blade 26 does not meet or exceed the first threshold ("NO" at decision block 1244), controller 304 can continue to monitor the position of driver blade 26 at 1242. In response to controller 304 determining that the position of driver blade 26 meets or exceeds the first threshold ("YES" at decision block 1244), controller 304 initiates a braking sequence for motor 308, for example, according to techniques previously described with reference to block 1228.

At 1248, controller 304 monitors the position of driver blade 26 and determines whether the position meets or exceeds a second threshold. In various implementations, the second threshold is less than the first threshold. In some examples, the second threshold is equal to the first threshold. In various implementations, the second threshold is greater than the first threshold. In some embodiments, the second threshold is in a range of between about 50% to about 100%. For example, the second threshold may be about 50%, 55%, 60%, 65%, 70%, 75%, 80%, 85%, 90%, 95%, or 100%. In some examples, the second threshold may be the same as the first threshold, and decision block 1248 may be omitted. In response to controller 304 determining that the position of driver blade 26 does not meet or exceed the second threshold ("NO" at decision block 1248), controller 304 continues monitoring the position of driver blade 26 at decision block 1248. In response to controller 304 determining that the position of driver blade 26 meets or exceeds the second threshold ("YES" at decision block 1248), controller 304 is configured to determine whether trigger switch 316 is activated at decision block 1250.

In response to controller 304 determining that trigger switch 316 has not been activated ("NO" at decision block 1250), controller 304 is configured to monitor for trigger switch 316 and safety switch 386 activations at block 1252, and process 1200 proceeds back to decision block 1250. In response to controller 304 determining that trigger switch 316 has been activated ("YES" at decision block 1250), controller 304 is configured to determine whether safety switch 386 is activated at decision block 1254. In response to controller 304 determining that safety switch 386 has not been activated ("NO" at decision block 1254), controller 304 is configured to monitor for trigger switch 316 and safety switch 386 activations at block 1252, and process 1200 proceeds back to decision block 1250. In response to controller 304 determining that safety switch 386 is activated ("YES" at decision block 1254), the controller 304 is configured to abort the braking sequence at block 1256. At 1258, controller 304 initiates a drive sequence and drives driver blade 26 from the top-dead-center position to the bottom-dead-center position (for example, according to any of the previously described techniques).

In some embodiments, controller 304 continuously monitors for sequences of trigger switch 316 activations followed by safety switch 386 activations when power tool 10 is in the second operating mode. In various implementations, if trigger switch 316 and safety switch 386 are both activated and remain activated before controller 304 begins the braking sequence, controller 304 bypasses the braking sequence and proceeds to initiate a new drive sequence when driver blade 26 reaches, for example, the top-dead-center position.

Figure 13:
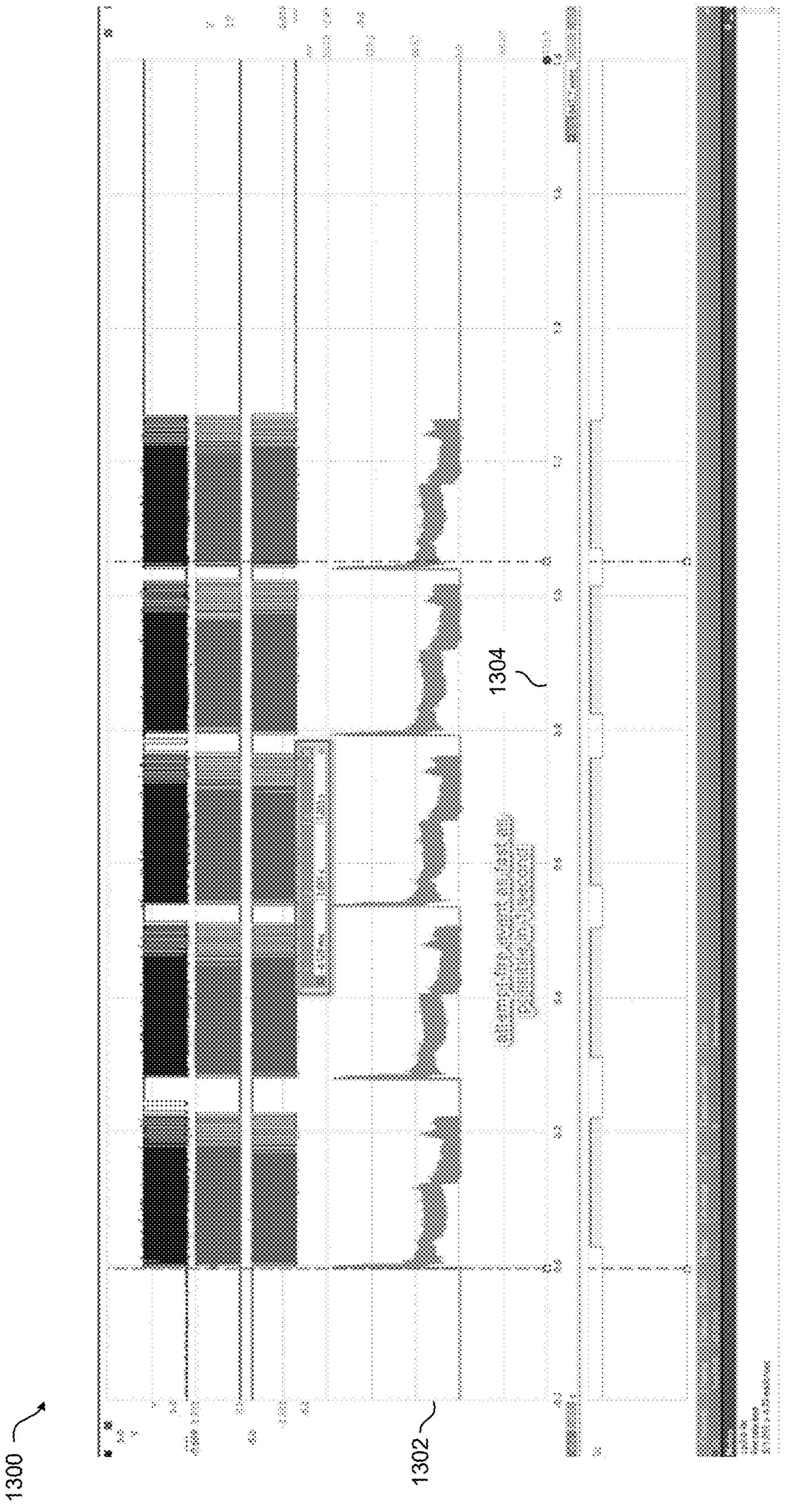
FIG. 13. illustrates waveforms used to drive an electric motor of a power tool, according to some embodiments.

FIG. 13 is a timing diagram 1300 illustrating waveforms used to drive motor 308 during retraction sequences in examples where motor 308 is a pulse width modulated motor. In various implementations, controller 304 controls gate controller 344, which controls switches, such as insulated-gate bipolar transistors (IGBTs) or metal oxide semiconductor field-effect transistors (MOSFETs) in inverter 348. FIG. 13 illustrates waveforms output from gate controller 344 to motor 308. The vertical axis 1302 of FIG. 13 illustrates voltage, while the horizontal axis 1304 of FIG. 13 illustrates time. The top row of FIG. 13 shows an example waveform provided to motor 308 during retraction sequences that include braking sequences. During the retraction sequence, the frequency of the pulse-width modulated signal is high. During the braking cycle, the frequency of the pulse-width modulated signal is reduced (and/or, in some embodiments, out of phase with the signal during the earlier retraction sequence), resulting in a lower operating speed for motor 308. As shown in FIG. 13, in some examples of power tool 10 where the brake abort feature is not activated, it may be possible to achieve about 4.7 operating cycles per second.

Figure 14:
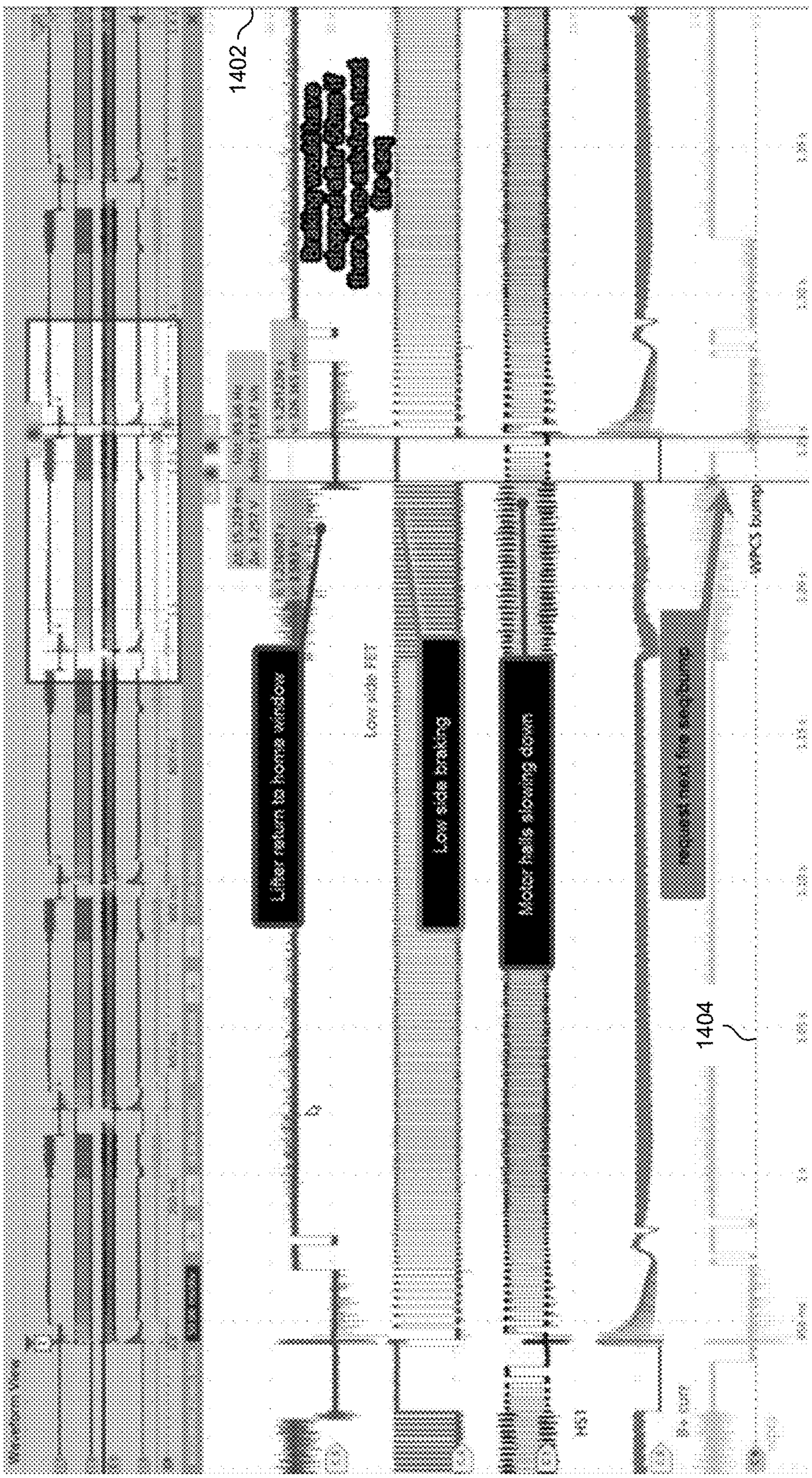
FIG. 14. illustrates waveforms used to drive an electric motor of a power tool with a braking abort sequence activated, according to some embodiments.

FIG. 14. is a timing diagram 1400 illustrating waveforms used to drive motor 308 in examples of power tool 10 with a braking abort sequence activated. The vertical axis 1402 of FIG. 14 illustrates voltage, while the horizontal axis 1404 of FIG. 14 illustrates time. As shown in FIG. 14, the braking cycle begins at about 1.175 seconds. At about 1.24 seconds, controller 304 commands a braking abort sequence, during which controller 304 discontinues braking motor 308. In some examples, including the braking abort sequence improves the number of operating cycles achievable per second from about 4.7 operating cycles per second to about 6.1 operating cycles per second.

Thus, embodiments described herein provide, among other things, a power tool including a brake abort feature for increasing a cycle rate (e.g., firing rate) of the power tool. Various features and advantages are set forth in the following claims.

What is claimed is:

1. A method of controlling an electric motor of a power tool comprising:

initiating a retraction cycle by controlling the electric motor to move a driver blade of the power tool from a first position to a second position;

determining a position of the driver blade during the retraction cycle;

bypassing, in response to the position of the driver blade exceeding a first threshold position, at least one of a first switch and a second switch being activated, and a braking cycle not yet having started, the braking cycle; and initiating a new drive cycle to move the driver blade from the second position to the first position.

2. The method of claim 1, wherein the power tool includes one or more sensors configured to detect revolutions of the electric motor, and wherein the method further comprises determining the position of the driver blade based on signals from the one or more sensors.

3. The method of claim 1, wherein the power tool includes one or more sensors configured to detect a portion of the driver blade, wherein the method further comprises determining the position of the driver blade based on signals from the one or more sensors.

4. The method of claim 1, wherein the power tool includes one or more sensors configured to detect a position of a lifter, the lifter being configured to engage with the driver blade, wherein the method further comprises determining the position of the driver blade based on signals from the one or more sensors.

5. The method of claim 1, further comprising:

initiating, in response to the position of the driver blade exceeding the first threshold position, the braking cycle at the electric motor; and aborting the braking cycle in response to the position of the driver blade exceeding a second threshold position.

6. The method of claim 5, wherein the second threshold is less than the first threshold.

7. The method of claim 6, wherein the first threshold is about 75% of the retraction cycle.

8. The method of claim 1, further comprising:

initiating, in response to the position of the driver blade exceeding the first threshold position, the braking cycle at the electric motor; and aborting the braking cycle in response to detecting a trigger switch being activated before a safety switch.

9. The method of claim 1, further comprising:

monitoring an operating mode selector to determine whether the power tool is in a first operating mode or a second operating mode;

initiating, in response to determining that the power tool is in the first operating mode, a drive cycle in response to detecting a safety switch being activated before a trigger switch; and initiating, in response to determining that the power tool is in the second operating mode, the drive cycle in response to detecting the trigger switch being activated before the safety switch.

10. The method of claim 9, further comprising:

initiating, in response to the position of the driver blade exceeding the first threshold position, the braking cycle at the electric motor; and aborting the braking cycle in response to the power tool being in the second operating mode.

* * * * *